US012641181B2

(12) United States Patent (10) Patent No.: US 12,641,181 B2
Clem, III et al. (45) Date of Patent: May 26, 2026

(54) SHARED RESOURCE ALLOCATION FOR MULTIPLE QUEUE PROCESSING

(71) Applicant: BITE NINJA, INC., Memphis, TN (US)

(72) Inventors: William Charles Clem, III, Arlington, TN (US); Anthony Scott Millward, Boise, ID (US)

(73) Assignee: Voicify Ninja LLC, Needham, MA (US)

( * ) Notice: Subject to any disclaimer, the term of this patent is extended or adjusted under 35 U.S.C. 154(b) by 40 days.

(21) Appl. No.: 18/490,694

(22) Filed: Oct. 19, 2023

(65) Prior Publication Data

US 2024/0155056 A1 May 9, 2024

Related U.S. Application Data

(60) Provisional application No. 63/423,794, filed on Nov. 8, 2022.

(51) Int. Cl.
  *H04M 3/00* (2024.01)
  *H04M 3/42* (2006.01)
  *H04M 3/523* (2006.01)
  *G06V 20/62* (2022.01)
  *G06V 40/16* (2022.01)
(52) U.S. Cl.
  CPC ....... *H04M 3/523* (2013.01); *H04M 3/42365* (2013.01); *G06V 20/625* (2022.01); *G06V 40/172* (2022.01)
(58) Field of Classification Search
  CPC ............. H04M 3/523; H04M 3/42365; G06V 40/172; G06V 20/625

USPC ....... 379/265.01–265.14, 266.01–266.1, 309
See application file for complete search history.

(56) References Cited

U.S. PATENT DOCUMENTS

| | | | | |
|---|---|---|---|---|
| 6,327,363 | B1 * | 12/2001 | Henderson ............. | G06Q 20/04 379/91.01 |
| 8,924,868 | B2 * | 12/2014 | Hammoud ............. | G06Q 30/00 715/761 |
| 9,661,139 | B2 * | 5/2017 | Harma .................... | H04M 3/56 |
| 9,888,117 | B1 * | 2/2018 | Ranganath .......... | H04M 3/5238 |
| 2007/0198329 | A1 * | 8/2007 | Lyerly ................ | G06Q 10/0639 705/7.42 |
| 2008/0177857 | A1 * | 7/2008 | Chakra ............... | H04L 67/1095 709/225 |

(Continued)

*Primary Examiner* — William J Deane, Jr.
(74) *Attorney, Agent, or Firm* — Scott Y. Shigeta; Newport IP, LLC

(57) ABSTRACT

Agents are allocated to process the requests of users in queues. Agents may be allocated to one of a number of queues located at different locations or different organizations. For example, agents may take an order at a restaurant or provide medical services. By assigning agents to a queue and also removing them from queues based on the detection of predetermined events, users waiting in the queue to interact with a system are provided a seamless experience with minimal wait time while enabling an organization to assign fewer agents to the queues. When a user approaches a station, an agent is connected to the station for communication with the user. The agent is selected by providing availability requests to multiple agents at the top of an agent pool. The first agent to confirm the availability request is selected for communication with the user.

18 Claims, 31 Drawing Sheets

(56)          References Cited

U.S. PATENT DOCUMENTS

| | | | |
|---|---|---|---|
| 2013/0117895 A1* | 5/2013 | Proksch ................. | B82Y 35/00 |
| | | | 850/1 |
| 2014/0146959 A1* | 5/2014 | Spence ................... | H04M 3/51 |
| | | | 379/265.09 |
| 2016/0165049 A1* | 6/2016 | King ........................ | H04M 3/12 |
| | | | 379/265.09 |
| 2017/0134581 A1* | 5/2017 | Vendrow ............... | H04W 4/023 |
| 2018/0217855 A1* | 8/2018 | Strellis ................... | G06Q 20/00 |
| 2019/0279181 A1* | 9/2019 | Kelly ..................... | G07F 9/023 |

* cited by examiner

1ST UI
281A

2ND UI
281B

AGENT
RENDERING
104

MENU

BEVERAGES

COFFEE

SANDWICHES

COMBOS

SUGGESTIONS:

POPULAR

YOUR HISTORY

LIVE AGENT: STEVE

−  0  +

LARGE PREMIUM ROAST

−  1  +

MEDIUM PREMIUM ROAST

MORE ITEMS

FIG. 2E

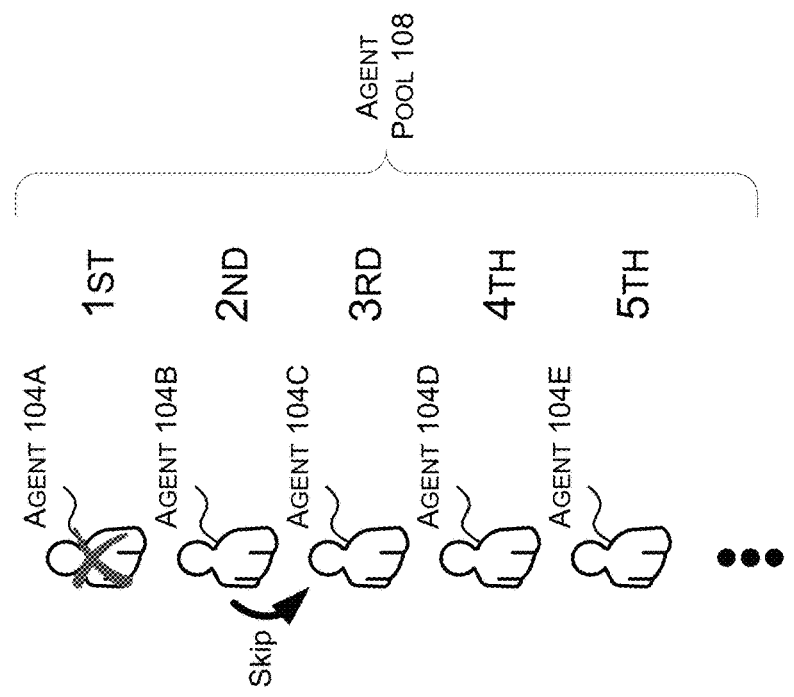
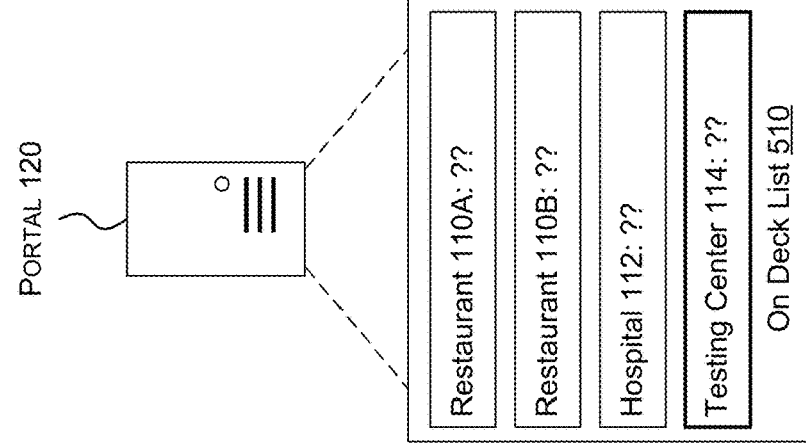
FIG. 6A

OPERATION 1: MENU HISTORY IS QUERIED BASED ON FACE OR LICENSE PLATE IN FIRST FOV

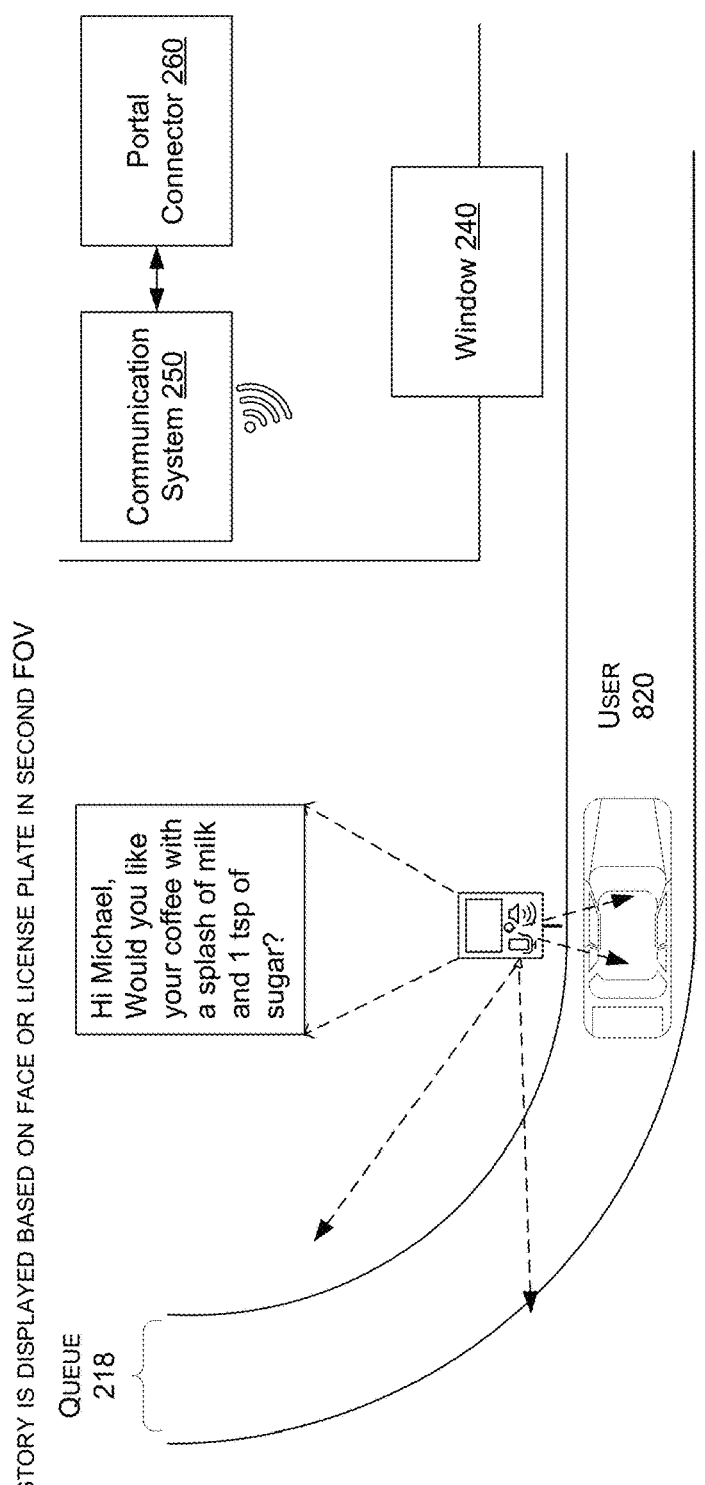
OPERATION 2: MENU HISTORY IS DISPLAYED BASED ON FACE OR LICENSE PLATE IN SECOND FOV
Portal Connector 260
Communication System 250
Window 240
QUEUE 218
Hi Michael, Would you like your coffee with a splash of milk and 1 tsp of sugar?
USER 820
FOV2 805B
FIG. 8C

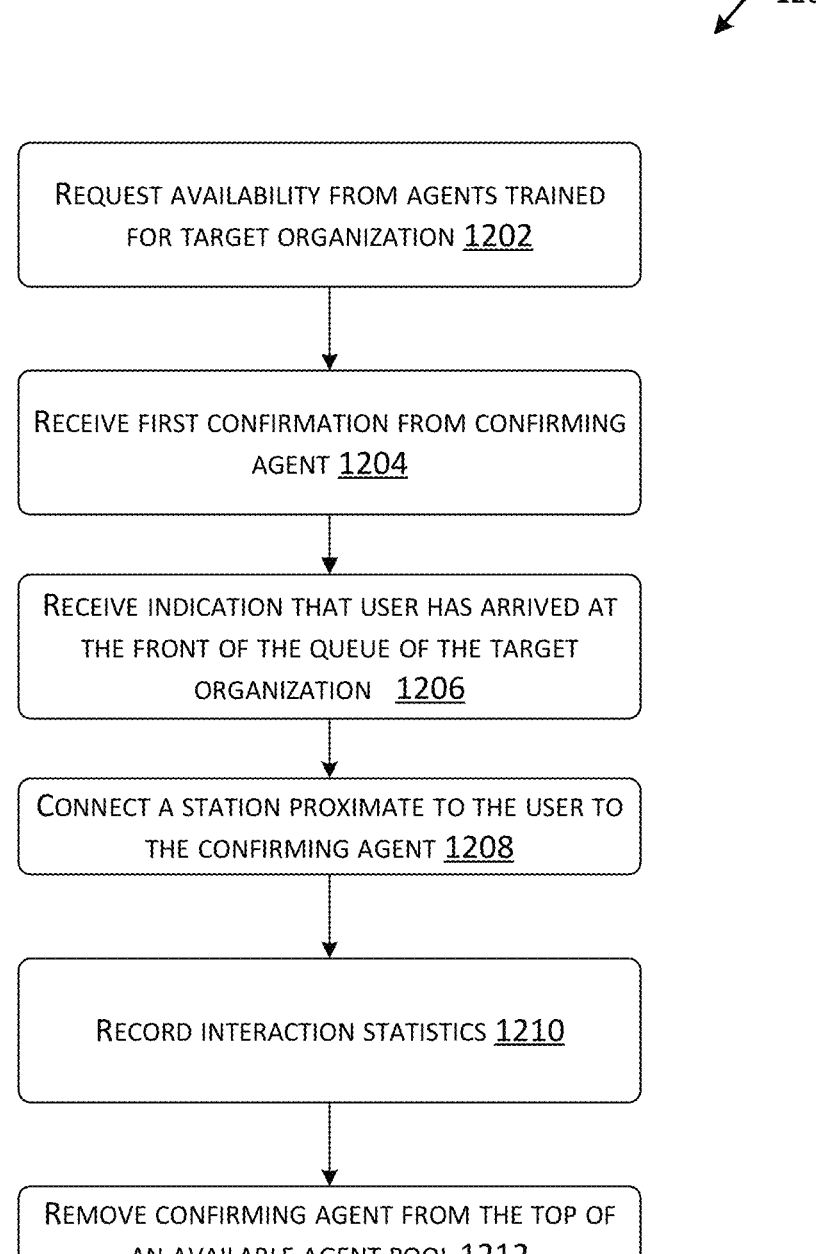

1200

REQUEST AVAILABILITY FROM AGENTS TRAINED FOR TARGET ORGANIZATION 1202

RECEIVE FIRST CONFIRMATION FROM CONFIRMING AGENT 1204

RECEIVE INDICATION THAT USER HAS ARRIVED AT THE FRONT OF THE QUEUE OF THE TARGET ORGANIZATION 1206

CONNECT A STATION PROXIMATE TO THE USER TO THE CONFIRMING AGENT 1208

RECORD INTERACTION STATISTICS 1210

REMOVE CONFIRMING AGENT FROM THE TOP OF AN AVAILABLE AGENT POOL 1212

FIG. 12

Figure 14:
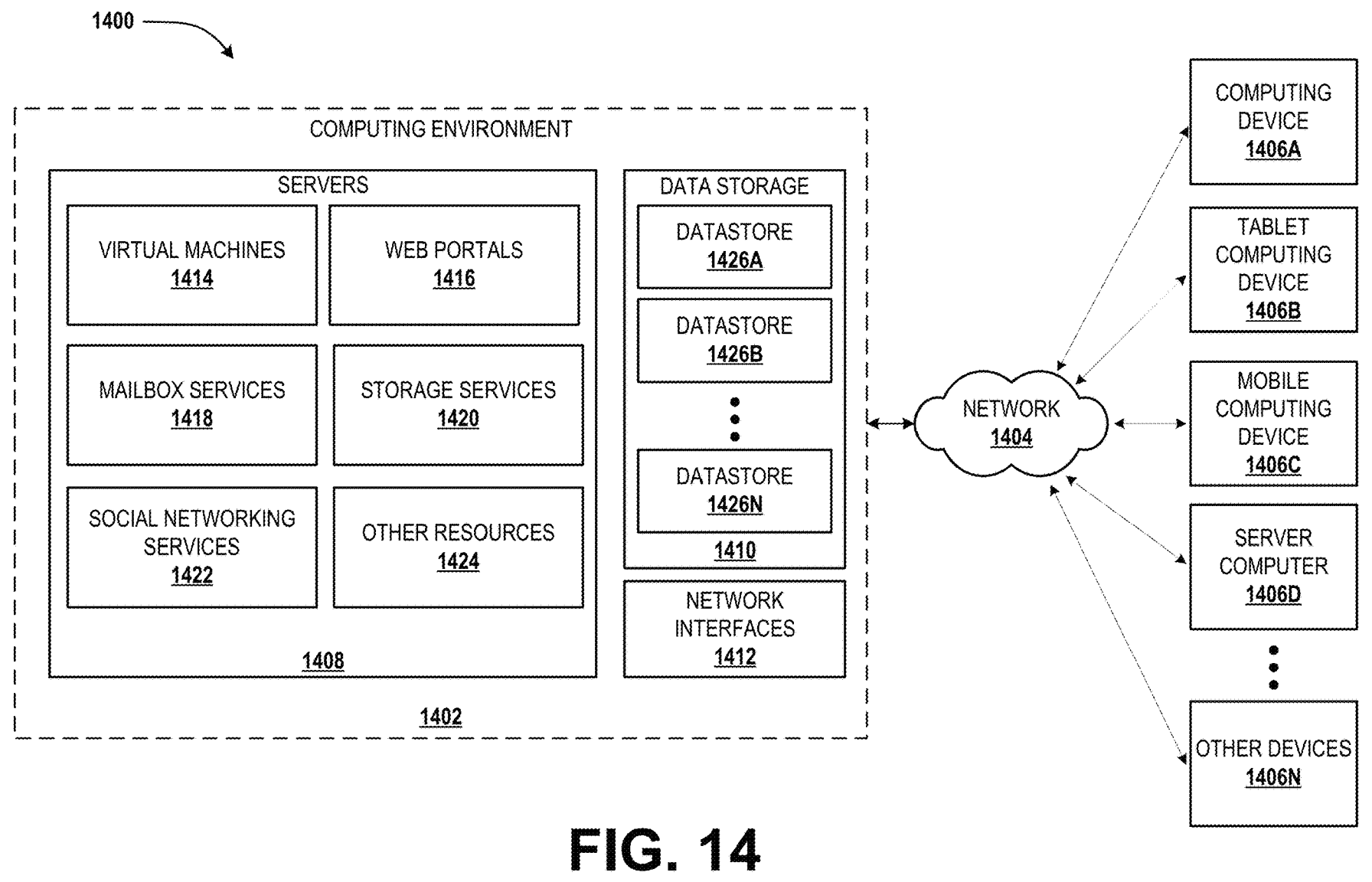

COMPUTING DEVICE 1406A

TABLET COMPUTING DEVICE 1406B

MOBILE COMPUTING DEVICE 1406C

SERVER COMPUTER 1406D

OTHER DEVICES 1406N

NETWORK 1404

COMPUTING ENVIRONMENT

DATA STORAGE

DATASTORE 1426A

DATASTORE 1426B

DATASTORE 1426N

1410

NETWORK INTERFACES 1412

SERVERS

WEB PORTALS 1416

STORAGE SERVICES 1420

OTHER RESOURCES 1424

VIRTUAL MACHINES 1414

MAILBOX SERVICES 1418

SOCIAL NETWORKING SERVICES 1422

SHARED RESOURCE ALLOCATION FOR MULTIPLE QUEUE PROCESSING

CROSS REFERENCE TO RELATED APPLICATION

This patent application claims the benefit of U.S. Provisional Patent Application Ser. No. 63/423,794 filed Nov. 8, 2022, entitled "SHARED RESOURCE ALLOCATION FOR MULTIPLE QUEUE PROCESSING," which is hereby incorporated in its entirety by reference.

BACKGROUND

Efficient resource allocation is a goal of many organizations. For example, organizations that provide services to individuals waiting in queues often allocate one agent per queue. If the queues remain busy on a near continuous basis, then this allocation scheme is efficient. However, many service-based organizations experience lulls, creating a scenario in which agents remain idle for extended periods of time. Not only does this result in low efficiency and high expenses, but the agents working on behalf of the organization may become unfulfilled. In addition, agents who are not working at optimal levels of engagement also cause inefficient use of computing resources and network resources. The systems remain in use even though some agents are not working to their full potential or at consistent production levels.

In light of recent economic changes, organizations now struggle more with staffing and labor issues. For a company with more than one location, potentially up to thousands store locations, it may be difficult to for a company to acquire staffing for all locations and have that staff available at all peak hours. A franchise may have too many staff members at one location and not enough staff members at another location. Kiosk systems have been implemented to remedy this issue. However, kiosk systems can be restrictive and tend to be cumbersome and inefficient for end users, e.g., customers approaching a counter. The current state of the industry relies heavily on a touch screen design, which limits a user's interaction. This drawback greatly limits the help a kiosk can provide, particularly if an end user has questions about a menu. It is with respect to these and other considerations that the disclosure made herein is presented.

SUMMARY

The techniques disclosed herein provide systems for allocating shared resources in service queues. In some configurations, agents are dynamically allocated to process orders of end users waiting in queues of an organization. Agents may be allocated to a queue located at one of a number of locations of a number of organizations. For example, an agent may be assigned to a queue to take an order from an end user at the top of the queue at a drive-through restaurant. Agents may be trained to perform any task for end users in a queue, which may also include, but is not limited to, taking orders at a drive-through restaurant, providing medical care at a drive-through clinic, taking orders at a front counter, or over a phone, etc. A system can connect one or more agents to a queue and allow selected agents to communicate with end users to fulfill their requests. The selected agents can maintain their connection with a particular queue until one or more predetermined events are detected, e.g., when there are no more end users in the queue, when selected agent requests to be removed, etc. When a predetermined event is detected, the selected agent is disconnected from an assigned queue. When a selected agent submits a request to be removed from a queue, that agent is replaced with a substitute agent that is selected using the processes described herein.

In some configurations, the system can apply different priorities to each queue for agent assignments based on a type of queue. There are several different types of queues, which can include, but is not limited to: a drive-thru queue, a counter queue, and a teleconferencing queue. The drive-thru queue can include any type of setup that serve customers in their motor vehicles. The counter queue can include any type of setup that serves customers in a building. The teleconferencing queue can include virtual meetings or phone calls from customers arranging a delivery or a pickup. In one embodiment, all types of queues have the same priority when agents are assigned. The agents are assigned to each queue on a first come, first served basis regardless of the type of queue that customers are detected. In other embodiments, the algorithm assigns a different priority to each type of queue. For instance, the system may prioritize a drive-thru queue over a teleconferencing queue, and prioritize the teleconferencing queue over a counter queue. In such an example, when a customer approaches a drive-thru, the assumption is that the user is in a hurry. Whereas a customer at a counter or a customer on a phone may not be in as much of a hurry compared to customers in a car. Thus, in such embodiments, if there are multiple customers waiting in each queue, the system would assign an available agent to drive-thru queue before the other types of queue.

To facilitate some of the above-described embodiments, a hardware sensor is used at the counter queues and/or the drive-thru queues. In such embodiments, the MQTT protocol may be used to notify agents that a user is present at a restaurant drive-thru or front counter. Eligible agents are informed in response to the detection of an end user and an audio system starts an audio connection between the current customer and the agent.

Agents may be selected and allocated to a particular queue in response to the detection of an end user entering a queue. When an end user approaches the queue, a sensor detecting the presence of the end user can cause the system to send work requests to a predetermined number of available agents. For instance, a number of available agents can be prioritized in an agent pool. Those agents can be prioritized using one or more factors including, but not limited to, performance metrics, first-in-line ordering, etc. In one illustrative example, if an available agent pool has five hundred available agents, the system may send work requests to the first three available agents based on their priority. The system can be configured to receive confirmations from each agent that receives a work request. The first available agent that provides a confirmation is selected as the primary agent that is to communicate with end users located at the queue.

Once an agent has been assigned to a queue, the agent is removed from the agent pool in response to the detection of a predetermined event. The agent may be connected to the system to communicate with an end user in the queue and provide services for the end users in the queue until the queue empties. When the system determines that a queue is empty, e.g., there are no more cars in the drive-through line, the agent is removed from the queue and the system disconnects the agent's communication with a communication station associated with the queue. When an agent is removed from a queue, that particular agent may be returned to the agent pool. When an agent is returned to the agent pool, in some embodiments, those agents are prioritized according to their performance metrics, or they may be positioned at the end of a line when a first-in-line model is utilized. An agent may also request to leave the queue. In such scenarios, the system can utilize the above-described process to select a new agent from the available agent pool before the agent is released from the queue.

In some embodiments, a system can control a position for each end user, e.g., each customer, within a queue. For example, for a teleconferencing queue, an end user may opt out of the queue for a predetermined amount of time, if they need more time to decide what to order. The system can receive an input from the end user, e.g., a voice command or a manual input to an input device, indicating an inactive status for the queue. The input can include a time for the inactive status. In some embodiments, the inactive status can be invoked in response to the system detecting a pause in communication. A detected pause for a predetermined time period causes a user to move into an inactive status for a time period, an "indicated time." In one specific example, an active period can be a predetermined time period, e.g., 5 minutes. The system can re-insert that end user into the queue after the indicated time has passed.

While the end user is in an inactive status, the system can send a prompt to the end user, prompting the end user to provide an updated status. In response, the system can receive an update indicating the end user wants to continue in the queue, or system can receive an update indicating the end user wants to drop from the queue. The user can choose to remain in the queue or opt out entirely. The prompt can be sent in response to one or more events. The event can include detection of the end user being in a next-in-line position, e.g., second place in line.

The system can also provide agent training tools and agent management tools. These tools include customized online courses and systems for monitoring the progress of each agent taking the online courses. The system monitors the progress of each agent, and automatically grants permissions for each agent to join an agent pool or one or more queues of a particular organization or certain queues within an organization based on the completion of predetermined training milestones. The system provides online courses that allow the agents to become trained for specific locations, e.g., specific restaurants. This allows organizations to require specific courses for a particular location, a specific queue, or a specific set of queues. The online courses provide simulated customer-agent interactions that allow the agents to practice orders using actual menus used at particular locations.

The system also automatically measures several performance metrics for the online courses, including speed and accuracy metrics for simulated orders. The system also automatically upgrades a user's skill level to more complex orders as the agent learns the software. When an agent meets a threshold performance metric for a course required for a location or a queue, that agent is allowed to join a pool for that location or a specific queue for a particular location. Then, that agent is eligible to be selected to interact with end users, e.g., customers, by the use of the other queuing techniques disclosed herein. By the use of these tools, before any agent's first shift, they have already learned the menu, practiced taking orders, and developed the trained reactions for a particular location. This system allows for scalability as well, since a large number of agent candidates can be trained and managed using automated training methods.

The training tools also provide administrative features that allow admin users, e.g., location managers, to oversee agent pools. The system provides a user interface (UI) that shows lists agents who have completed predefined training tasks and who have been added to agent pools for a particular location. This UI allows a manager to see which agent is available for a pool, and tools for allowing the manager to assign agents to pools, or allows the manager to confirm agents who are recommended to specific pools. In one illustrative example, consider a scenario where there are 20 restaurant locations for a single pool. The management user interface can show agent pools and individual lobbies that are each associated with individual restaurants within an organization. Each lobby can show specific agents that are associated with a specific admin user, e.g., a manager, and each lobby can be associated with a specific location. In such an example, there might be 20 different lobbies, one lobby per franchise rather than one lobby for an entire company.

The system can generate a UI showing information about each agent and their association with any assigned queues. The UI can also show representations of individual locations, e.g., restaurants, and stations within each location for each manager. A station is a point of contact for a particular queue. For instance, on a drive-thru, a station is the point at which a customer's vehicle reaches a camera and microphone. This system allows the managers to oversee a large number of organizations, locations, and individual stations at each location.

The system grants each manager permission to access each agent profile. This allows each manager to oversee a station if any issues arise. For example, the system can provide a manager with an input control that removes an agent's from a particular station if the agent is having connectivity issues or if they are encountering other customer interaction issues. Managers can remove agents from a queue or add agents into a queue. The system can provide a notification to a manager if a minimum threshold of agents is reached, e.g., there are not enough assigned agents in a queue. A minimum threshold is the number of agents needed in a queue to ensure that the system is operating as efficiently as possible. The agents can be manually added to a queue, or the system can automatically allocate agents as needed to fulfill a minimum threshold of agents. The system can also allow managers to approve or decline any new agent that is automatically added to a queue.

By dynamically connecting agents to a queue and disconnecting agents in response to particular events, a system can provide a seamless, consistent customer service experience while allowing an organization to maintain a reduced number of active agents versus a number of agents that is normally required by traditional drive-through systems. For example, by the use of the techniques disclosed herein, a restaurant chain can staff 20,000 individual franchise locations using 5,000 to 15,000 agents who are dynamically allocated and re-allocated to queues at each location. This can greatly improve efficiency and utilization of a number of resources, including human resources and computing resources, versus traditional systems. Traditional systems require at least one agent fully dedicated to each franchise location, and traditional systems can involve processes where each agent and their associated systems have hours of idle time per day. Additionally, the same pool of agents is used for all the different types of agent queues, further improving the efficiency of these organizations.

In some configurations, a pool can be assigned to a select set of queues. This can include all queue types, e.g., counter queues, drive-thru queues, and teleconferencing queues. In addiion, the pool can be assigned queues at different site locations. This allows agents assignments to jump from city to city within the same organization or even within different companies. This allows a group of agents to serve in queues and locations where they are needed most and times where they are needed. For example, an agent may take an order at a pizza shop in Oakland, CA from a front counter, then be immediately reassigned to take an order at an Italian restaurant in Arlington, VA from a drive-thru. These features allow managers to assign agents to queues and locations and companies based on their trained skillset. In addition, the disclosed features also allow managers to utilize a smaller number of agents to service locations in different time zones. This allows one set of agents to work with several workload waves, e.g., multiple lunch rushes. In another example, a single company, for example, a mom-and-pop restaurant with one location, can be put in the same queue as other similar shops. The agents provide an opportunity for these organizations to greatly reduce the number of people needed to staff a smaller company. For example, instead of needing ten people for ten locations, a manager could have three people running those ten locations, even though the locations are associated with different companies.

The system provides live video and audio feeds of an agent to each customer station. The live video feeds of each agent provide more efficiency to an organization than a typical kiosk because the end user is able to make a visual and audio connection with an agent. Being able to see the face of the agent helps each end user, e.g., each customer, have a better customer service experience, and it also helps with the speed and accuracy of each order. Agents allow a user to ask questions, a feature that most kiosks may not be able to provide.

In some embodiments, a system may utilize artificial intelligence (AI) features for assisting agents in taking orders. In such embodiments, a menu could be accessed by the system. Then, by the use of one or more AI models, the system can use the menu items to help an agent populate an order and/or verify whether the entries are correct. The system can monitor the voice signal of the end user, and by the use of a voice to text translation and by the use of the output of the AI model, the system can populate the order entry for the agent. The agent can then either accept the recommendation or deny it. In addition, the system can use the output of the AI model to help the agent with line completion for text entries. The AI model can be improved based on the agent's feedback.

In other embodiments, an AI model may be utilized in providing order recommendations using a customer's order history. For example, if a user is ordering an ice cream cone with a number of toppings, AI model can provide recommendations based their order history or based on order histories of other customers. In some instances, the AI model can provide recommendations based on order histories of other customers having similar profiles.

In another example, the system can use facial recognition or license plate recognition to provide order recommendations. For example, if the system recognizes a user by the use of facial recognition or license plate recognition, the system will provide the agent with the user's information, such as the user's name, favorite sauces (e.g., barbecue sauce, ranch, etc.), and how often the user visits the organization (e.g., three times a week). The agent can then create a more personal connection with the user by knowing their preferences upon the user's arrival. This allows a system to automatically populate a customer's order that is based on the facial recognition or license plate recognition and by the use of that user's order history. This can greatly shorten the amount of time a customer spends at any one station, particularly when an end user has a number of customizations to a menu item. This can also increase the efficiency of each agent as there are fewer mistakes and fewer manual data entry points.

The disclosed system addresses the technical problem of computing resource efficiencies and security issues. The disclosed system solves these technical problems by providing control of audio signals and video signals that are connected and disconnected in response to the detection of one or more specific events. For instance, by selecting a subset of agents prior to a single agent accepting an agent request, the system can cause an automatic connection that can reduce computing cycles, memory usage and network bandwidth by providing a connection between an agent and a station without user input for selecting or connecting the agents to the stations. Secure connections that are disconnected in response to the detection of one or more specific events also help avoid cross talk and the communication of information to users and agents that are not part of the same order. Agents are disconnected at appropriate times for avoiding confusion between different end users. Security of information, particularly in a drive-up medical station, is improved by the timing of when audio and video connections are connected and disconnected.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2E is a second user interface arrangement that can be used with a station associated with a counter queue.

FIG. 6A illustrates skipping an untrained agent while soliciting availability for an organization.

FIG. 8C illustrates a display notification an agent receives based on FOV2 when taking a user's order.

FIG. 12 is a flow diagram of an example method for shared resource allocation for multiple queue processing.

FIG. 14 is a diagram illustrating a distributed computing environment capable of implementing aspects of the techniques and technologies presented herein.

DETAILED DESCRIPTION

Figure 1:
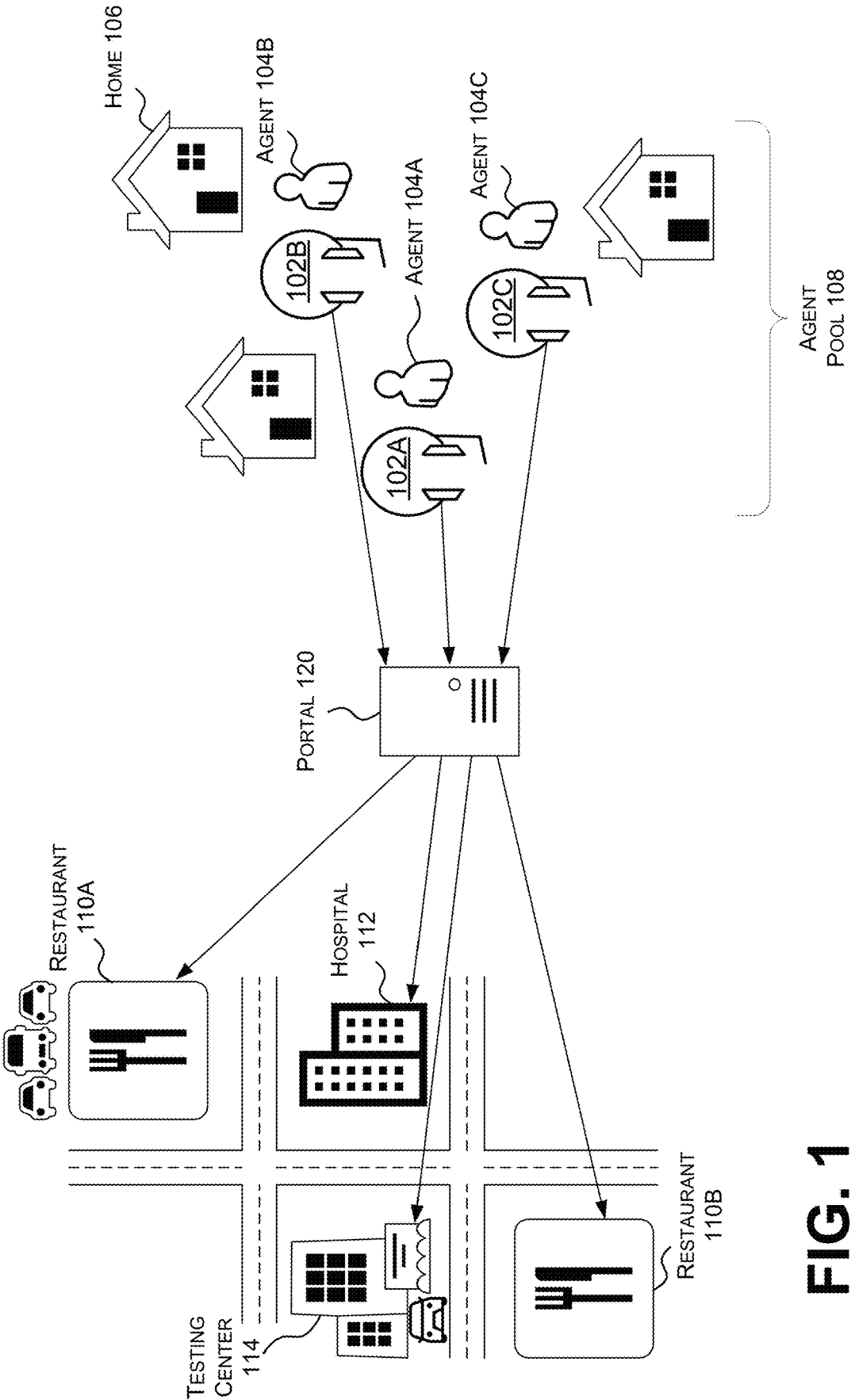
FIG. 1 illustrates an overview of a portal that allocates customer service agents to different organizations.

FIG. 1 illustrates an overview of a portal 120 allocating customer service agents 104 to customer service tasks at different organizations. For example, an agent 104 may communicate with a customer of restaurant 110A. In other examples, an agent 104 may communicate with a patient of healthcare facility 112, a subject of test center 114, etc. In some configurations, agents 104 work from home 106. Additionally, or alternatively, agents 104 may work in an office or any other location that is connected to the Internet. Agents 104 may use headsets 102 to communicate with users of the organizations via customer service stations located at the heads of queues at various locations of the organizations.

Restaurant 110A may have a drive-thru window. When a car approaches the ordering station of restaurant 110A, portal 120 will connect an available agent 104 to the ordering station. Similarly, restaurant 110B may have an indoor ordering station. When approached by a user, portal 120 may connect an available agent 104 that is trained to guide the user through the ordering and payment process of restaurant 110B. Organizations such as those depicted in FIG. 1 may have multiple locations around the world. Agents 104 are trained to perform customer service tasks for particular organizations, expanding the number of tasks that an individual agent 104 may perform.

The system provides live video and audio feeds of an agent to each customer station. The system can also provide live video and audio feeds of the customer back to an agent. The live video feeds of each agent provide more efficiency to an organization than a typical kiosk because the end user is able to make a visual and audio connection with an agent. Being able to see the face of the agent helps each end user, e.g., each customer, have a better customer service experience, and it also helps with the speed and accuracy of each order. Agents allow a user to ask questions, a feature that most kiosks may not be able to provide.

Figure 2A:
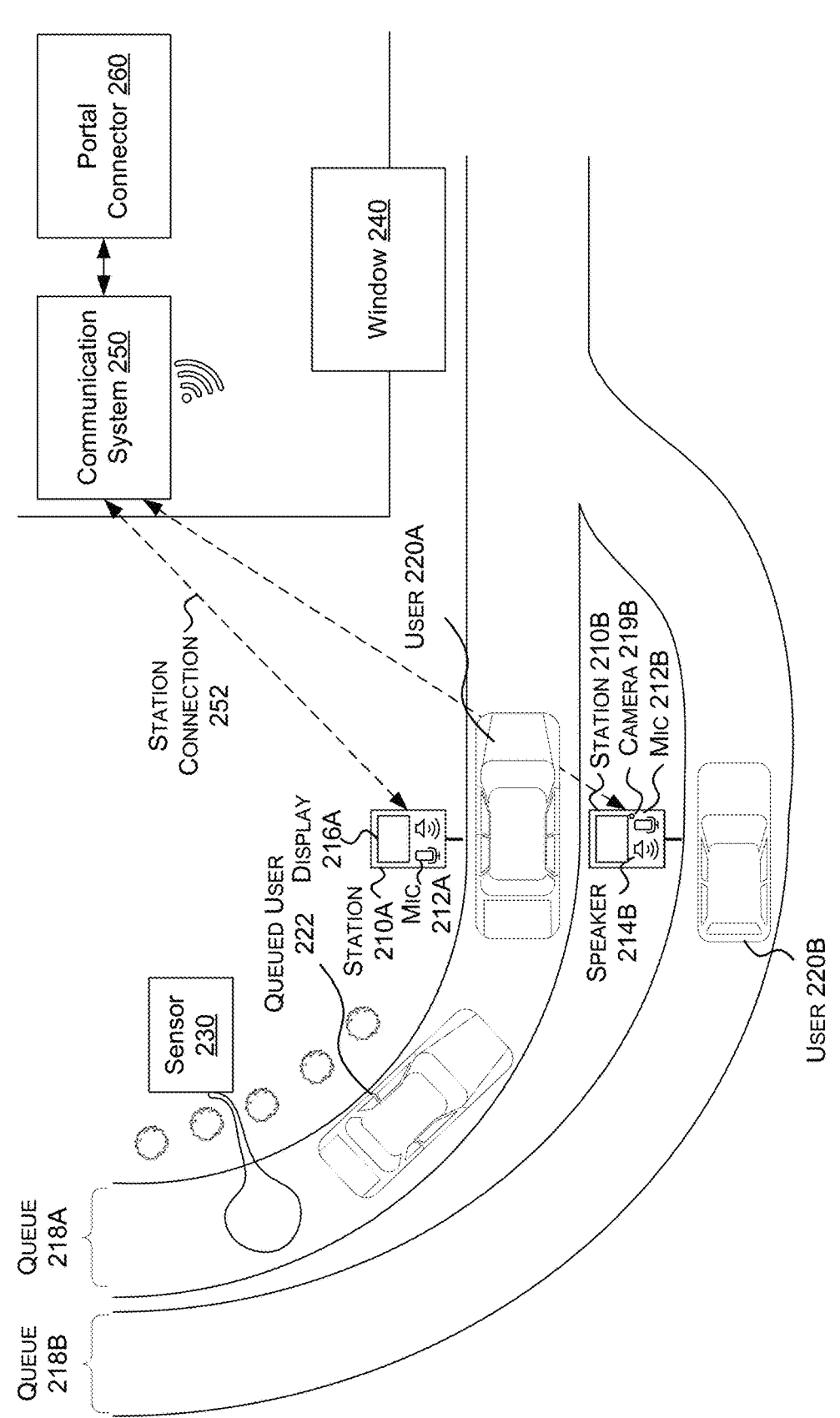
FIG. 2A illustrates a drive-through restaurant staffed by off-site agents.

FIG. 2A illustrates a drive-through restaurant 110A in which ordering is handled by off-site agents 104. User 220 pulls up to station 210 of queue 218 that contains microphone 212, speaker 214, and display 216. User 220 may interact with station 210 to order food.

Upon pulling up to the front of an empty queue 218, user 220 is quickly connected with one of agents 104. For example, user 220 may use microphone 212 and speaker 214 to interact with the communication system 250. The communication system 250 is connected to an agent 104 via portal connector 260 and portal 120. In some configurations, portal connector 260 is a custom-made device that interoperates with the communication system 250. In this way, instead of transmitting the audio conversation with user 220 wirelessly to a headset within restaurant 110A, the audio conversation is transmitted over the Internet via portal connector 260 and portal 120 to agent 104. If agent 104 is connected quickly enough, e.g., in under 5 seconds, user 220 may not know that agent 104 is working remotely from restaurant 110A. In some configurations, if agent 104 is not available immediately when user 220 pulls up to station 210, a pre-recorded greeting may be played to indicate that someone will be there shortly.

User 220, as guided by agent 104, makes a selection which agent 104 enters into portal 120. When user 220 has completed their order, user 220 may provide a payment method such as a credit card to station 210. The credit card may be processed by portal 120 directly with a payment provider, i.e., without allowing any credit card information to be exposed to the computing device used by agent 104. Once the order has been paid for, as indicated by portal 120, agent 104 will instruct portal 120 to submit the order to restaurant 110A, where it may be filled and provided to user 220.

Quickly connecting user 220 with agent 104 is important to creating a satisfying user experience. In order to reduce the amount of time that user 220 must wait at station 210, sensors may be used to detect when user 220 is approaching the front of an empty queue 218. For example, sensor 230 is a loop sensor that detects a car passing over it. Once sensor 230 is triggered, portal 120 will indicate to the user for that organization that they will be connected and are to begin taking the order. If the amount of time it takes for agent 104 to connect to station 210 is at most the amount of time it takes for user 220 to proceed from sensor 230 to station 210, then agent 104 will appear to have been instantly available to user 220. Other sensor technologies are similarly contemplated, such as computer vision algorithms that detect an approaching user. A sensor may be positioned at a predetermined distance away from a station. This enables the system to detect a vehicle prior to their arrival at the station. This can reduce the amount of time a person has to wait at the station while the system selects a particular agent.

In some configurations, once an agent 104 is assigned to a queue 218, that agent 104 will remain assigned to the same queue until it is cleared, or until the agent 104 indicates that they need a break.

Figure 2B:
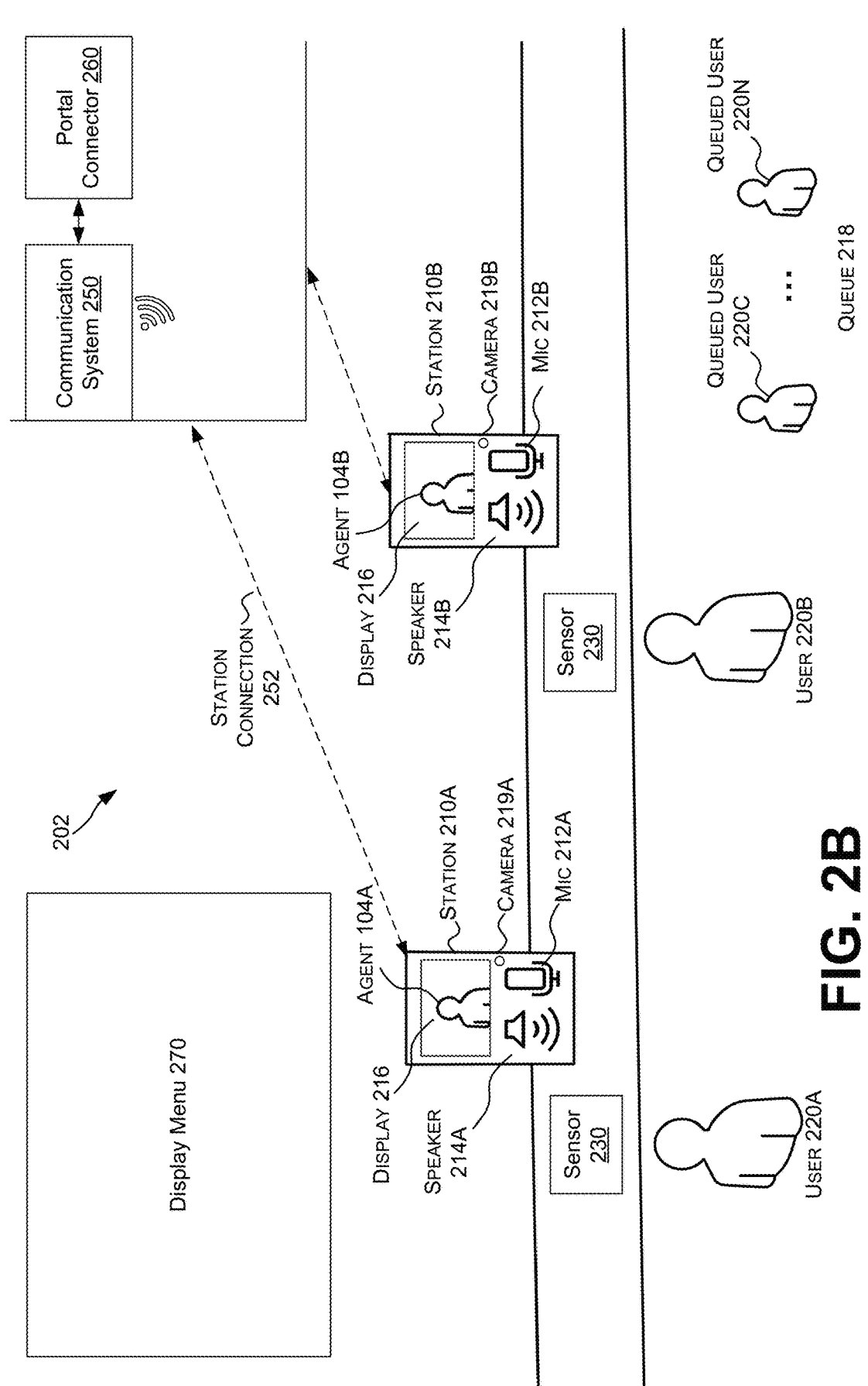
FIG. 2B illustrates a front-counter restaurant staffed by off-site agents.

FIG. 2B illustrates the front counter configuration for a restaurant 202 in which ordering is handled by off-site agents 104. The end users 220 can approach a station 210 at the restaurant 202. The end users 220 can also form a queue 218 near each station. Each station can contain a microphone 212, a speaker 214, and a display screen 216. The end users 220 can interact a live video rendering of an agent 104 shown in the display screen of each station 210 to place an order. The agent can answer questions, explain the menu, and enter the order information for the end user.

As the end user reaches the front of the queue 218 and approaches a station 210, the system uses a proximity sensor to automatically connect the user 220 with an assigned agent 104. For example, a sensor 230 may be in the form of an infrared detector or a radio proximity sensor detecting an end user within a predetermined distance. Once a user 220A is detected, the system can activate a microphone 212A and speaker 214A to enable the user 220A to interact with communication system 250. The communication system 250 is connected to an agent 104 via portal connector 260 and portal 120 (FIG. 1). In some configurations, portal connector 260 is a custom-made device that interoperates with the communication system 250. In this way, instead of transmitting the audio conversation with user 220A wirelessly to a headset within the restaurant, the audio conversation is transmitted over the Internet via portal connector 260 and portal 120 to agent 104. If the agent 104 is connected quickly enough, e.g., in under 5 seconds, user 220 may not know that agent 104 is working remotely from restaurant 110A. In some configurations, if agent 104 is not available immediately when the user 220A walks up to station 210, a pre-recorded greeting may be played to indicate that the agent 220A will arrive shortly.

The user 220A, as guided by agent 104 in a conversation with the user 220A, makes a selection and the agent 104 enters the selections into the portal 120. When user 220A has completed their order, user 220A may provide a payment method such as a credit card to station 210A. The credit card may be processed by portal 120 directly with a payment provider, i.e., without allowing any credit card information to be exposed to the computing device used by agent 104. Once the order has been paid for, as indicated by portal 120, agent 104 will instruct portal 120 to submit the order to restaurant 110A, where it may be filled and provided to user 220.

Having a system that enables a quick connect between the end user 220 and the agent 104 is important to creating a satisfying user experience. In order to reduce the amount of time that user 220 must wait at station 210, sensors may be used to detect when user 220 is approaching the front of an empty queue 218. For in other examples, sensor 230 is a loop sensor that detects an approaching user. Once sensor 230 is triggered, portal 120 will indicate to the end user 220 that they will be connected to an agent.

In some embodiments, the position of the sensor can be at a predetermined distance from a station. For example, the sensor 230 can be positioned such that the amount of time for establishing a connection between the agent 104 and the station 210 less than the amount of time it takes for the user 220 to move from the sensor 230 to station 210. This will give the appearance that the agent 104 is instantly available as the user 220 approaches the counter. Other sensor technologies are similarly contemplated, such as computer vision algorithms that detect an approaching user. By placing the sensor at a predetermined distance away from the front counter station, the system can give the agent time to connect to the station prior to the arrival of the end user. This can reduce or eliminate the amount of time a person has to wait at the front counter station while the system selects a particular agent. This technique can also be used in the drive-thu embodiments as well.

In some configurations, once an agent 104 is assigned to a queue 218, that agent 104 will remain assigned to the same queue until it is cleared, or until the agent 104 indicates that they need a break. Similar to the other embodiments disclosed herein, the system can remove agents from a queue in response to the detection of one or more events. Agents are re-assigned to a queue in response the detection of an end user by one or more sensors.

Figure 2C:
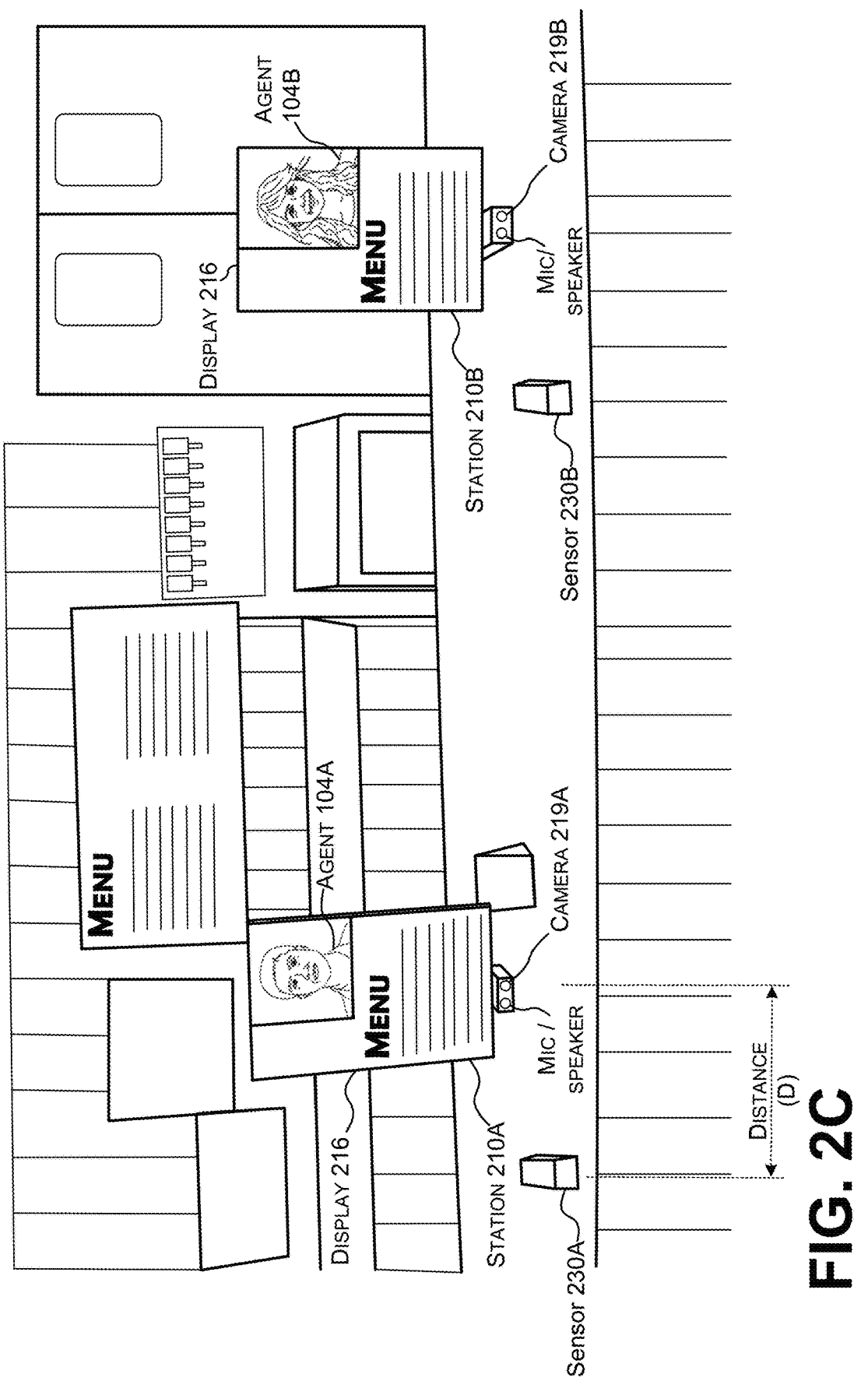
FIG. 2C is a perspective drawing of a restaurant having stations for a counter queue that can be staffed by off-site agents.

FIG. 2C illustrates a perspective drawing of a restaurant having stations used for a counter queue that can be staffed by off-site agents. This figure shows how the rendering of the agents on a display screen 216 can be directed toward the front of a counter, allowing the station to replace an in-person agent. This allows customers to approach a counter and place an order in a traditional manner. Each station 210 is positioned at a predetermined distance from each corresponding sensor 230.

In this example, each sensor is positioned on the left side of the station. This configuration can be used in a scenario where a queue of customers is located on the left side fo the station. Thus, as customers approach the station from the left, the sensor detects the presence of the customer at a first time $(T_1)$ prior to a second time $(T_2)$ at which the customer is standing in front of the camera 219 of the station. The position of each sensor 230 can be such that the difference between the first time $(T_1)$ and the second time $(T_2)$ is greater than a threshold time $(T_{th})$. The threshold time can be based on a number of agents in a pool and/or a performance metric of agents in a pool. For instance, if a pool typically has a first number available agents and a first average response time for responding to a customer notification, the sensor can be set a first distance $(D_1)$. However, if the pool typically has a second number available agents and a second average response time for responding to a customer notification, the sensor can be set a second distance $(D_2)$ that is greater than the first distance $(D_1)$ if the second number available agents is less than the first number of available agents and/or the second average response time is greater than the first average response time.

Figure 2D:
FIG. 2D is a first user interface arrangement that can be used with a station associated with a counter queue.
Figure 2F:
FIG. 2F shows that the system can toggle a display between the first user interface arrangement and a second user interface arrangement based on one or more detected events.

Turning now to FIGS. 2D-2F, embodiments for controlling user interface arrangements displayed at a station are shown and described below. In some configurations, the system can display different types of user interface arrangements in response to the detection of one or more predetermined events. A first user interface arrangement can include a standard kiosk format having a list of menu items, an interaction tools for allowing a user to select menu items, and shopping cart features for allowing a user to purchase the items. A second user interface arrangement can include one or more features of the kiosk format but also include a live video feed of an agent for assisting a user at the station. The live video feed can be a one-way feed for allowing the user to view the agent, or the live video feed can be a two-way feed for also allowing the agent to view the user for understanding context. In either embodiment, the station can also include a camera for detecting gestures of the user.

In one illustrative example, as shown in FIG. 2D, a display screen 216 of a counter station 210 can default to a standard ordering kiosk format. In this first user interface arrangement 281A, the display can include a number of item categories and/or specific items that a user can select. When specific item categories are selected, the system can display items within a particular category. In this example, a coffee category is selected and individual coffee options are displayed with an input tool for selecting a quantity of each item. In addition, the first user interface arrangement can allow a user to select individual item and allow that person to check out using a shopping cart tool. When selected, the shopping cart tool can include a list of selected items and functionality to enable a transaction for the purchase of the selected items.

When the system detects one or more predetermined events, the system can transition from the first user interface arrangement to a second user interface arrangement. An example of the second user interface arrangement 281B is shown in FIG. 2E. In this embodiment, the second user interface arrangement can include a rendering 104 of a live video feed of an agent who can assist the user in placing an order. The live video feed can be accompanied by a bidirectional live audio feed between the user and the agent. The system can also enable permissions for the agent to update the user's shopping cart. This allows the user to ask questions about the menu, confirm order selections, and allow the agent to provide an input causing the system to update the shopping cart of newly selected items on the user's behalf. When the user indicates that they no longer need assistance, which can be a user interface input or a voice input, the system can remove the live video feed of the agent, disconnect the audio connection, and disable permissions for the agent to modify the user's shopping cart. When the agent is disconnected from the station, the system changes the permissions so that the selected agent is restricted from modifying the user's cart for that particular station. When the live video feed is disabled, the system can cause the display of the first user interface arrangement 281A, as shown in FIG. 2F.

The detection of one or more predetermined events can include interactions between a user, e.g., a customer, and a station. For example, if a user has difficulty ordering, the system can generate one or more notifications for an agent to connect to the station. The agent can be selected using any of the techniques discussed herein. The agent can be connected via live video and audio connections so they can have a conversation with the user at the station. In some embodiments, the predetermined events can be a detected pause for selections for more than a predetermined period of time. If a person takes more than the predetermined period of time without providing an input, the system can notify an agent and then cause a connection between the station and the agent computer. The predetermined events can also be a number of corrections to an order, e.g., when a user deletes a threshold number of items and/or replaces a threshold number of items. In the detection of such events, the system can notify an agent, connect the agent and change permission for that agent to modify a shopping cart for the associated user.

In some embodiments, the predetermined events can also be one or more predetermined gestures captured by a camera or microphone of the station. The predetermined gestures can include an expression showing confusion, frustration, etc. Images of the user, e.g., video frames, can be communicated to a generative pretrained transformer model with a prompt asking for a text description of an expression. In one example, if the model returns a description indicating frustration or confusion, and a confidence score of that indication is over a threshold value, the system can detect a predetermined event and initiate a notification for, and a connection with, an agent. Text transcriptions of the user's speech can also be communicated to a generative pretrained transformer model with a prompt asking for a text description of an expression. In one example, if the model returns a description indicating frustration or confusion from the user's speech, and a confidence score of that indication is over a threshold value, the system can detect a predetermined event and initiate a notification for, and a connection with, an agent. The confidence score can be returned from the model by the use of a prompt sent with the speech input or the video input, where the prompt can explicitly request for a mood or expression of the input and a confidence score of a determined mood or expression.

Figure 3:
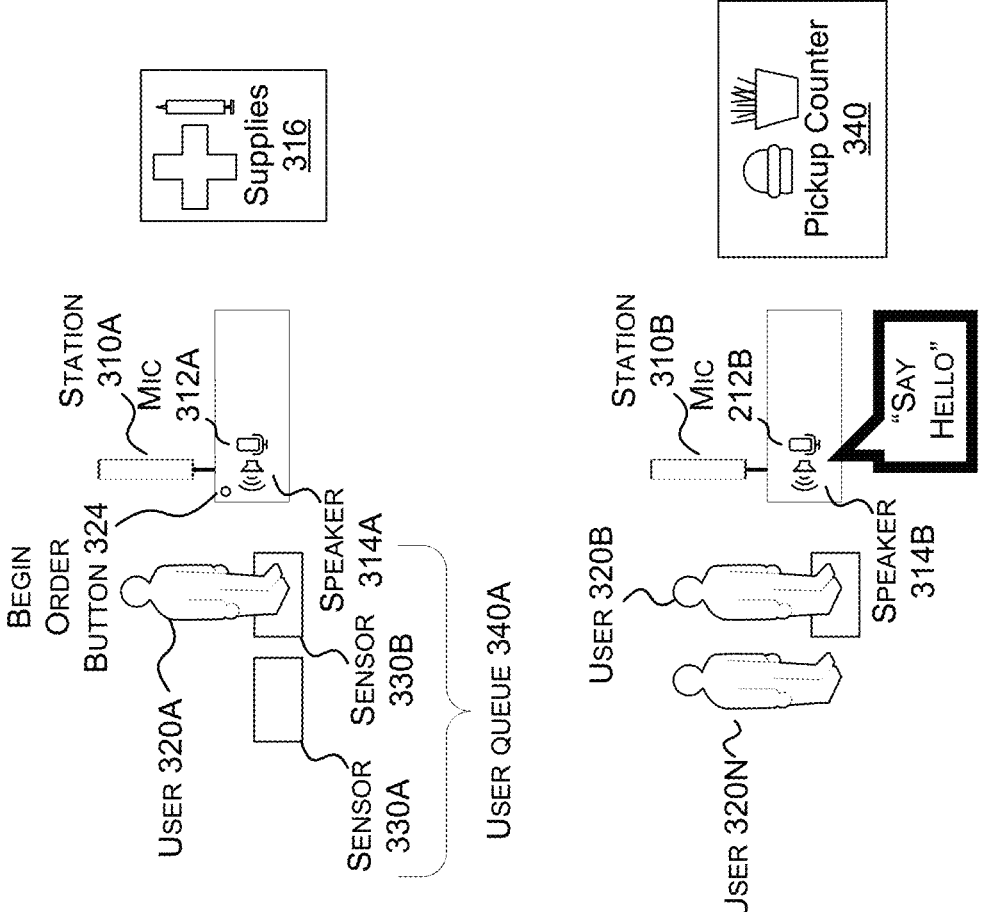
FIG. 3 illustrates stations of a restaurant staffed by off-site agents.

FIG. 3 illustrates another example of how stations can be configured in a restaurant 110B staffed by off-site agents 104. This example shows how pressure sensors on the floor can be used to detect the movement and position of end users in a queue. Similar to an optical or sonar-based sensor, multiple floor sensors can detect a rate in which a queue is moving. Based on the rate in which a customer is moving through a queue, the system can change the timing at which an agent is notified or connected to a station. Users 320 may form a line in user queue 340. The head of user queue 340 is approximate to station 310, which uses microphone 312 and speaker 314 to communicate with one of agents 104. In some configurations, a sensor 330 is used to detect an approaching user 320. This allows enough lead time for the agent 104 to connect and begin taking the order. Additionally, or alternatively, begin order button 324 may be pressed by user 320 to initiate an ordering session. Other techniques for beginning an order are similarly contemplated, including voice activation using mic 312, optionally in response to a voice prompt generated by speaker 314. In some configurations, once an agent 104 is connected to a station 310 of a queue 340, then that same agent 104 remains connected to station 310 until the queue 340 is cleared. For example, if user 320B completes their order and leaves Q340B, user 320C may approach station 310B and begin their order with the same agent 104 that helped user 320B.

Pickup counter 340 illustrates the result of an order that has been submitted and prepared. While the example of a restaurant is used predominantly throughout this application, other embodiments are similarly contemplated, such as administering a medical test. In this scenario, user 320 is a patient who wants to know if they have a particular condition. Agent 104 may guide user 320 through the testing process. In this scenario, supplies 316 may include a test kit.

Figure 4:
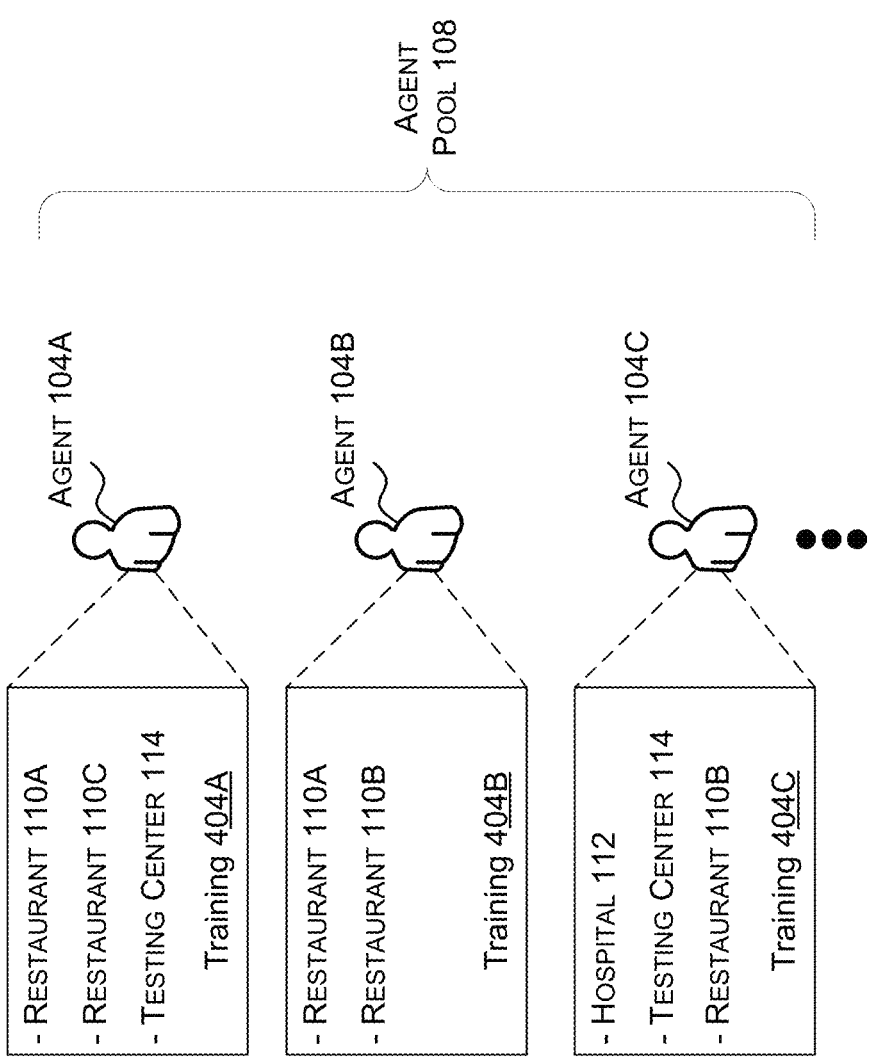
FIG. 4 illustrates training records of different agents.

FIG. 4 illustrates training records 304 of different agents 104. Each agent 104 of agent pool 108 may be represented by a record in a database. Training records 304 list which organizations a particular agent 104 has been trained to work with. As illustrated, training 304A indicates that agent 104A is certified to work with restaurant 110A, restaurant 110C, and testing center 114. Similarly, agent 104B is certified to work with restaurant 110A and restaurant 110B, while agent 104C is certified to work with hospital 112, testing center 114, and restaurant 110B.

Figure 5A:
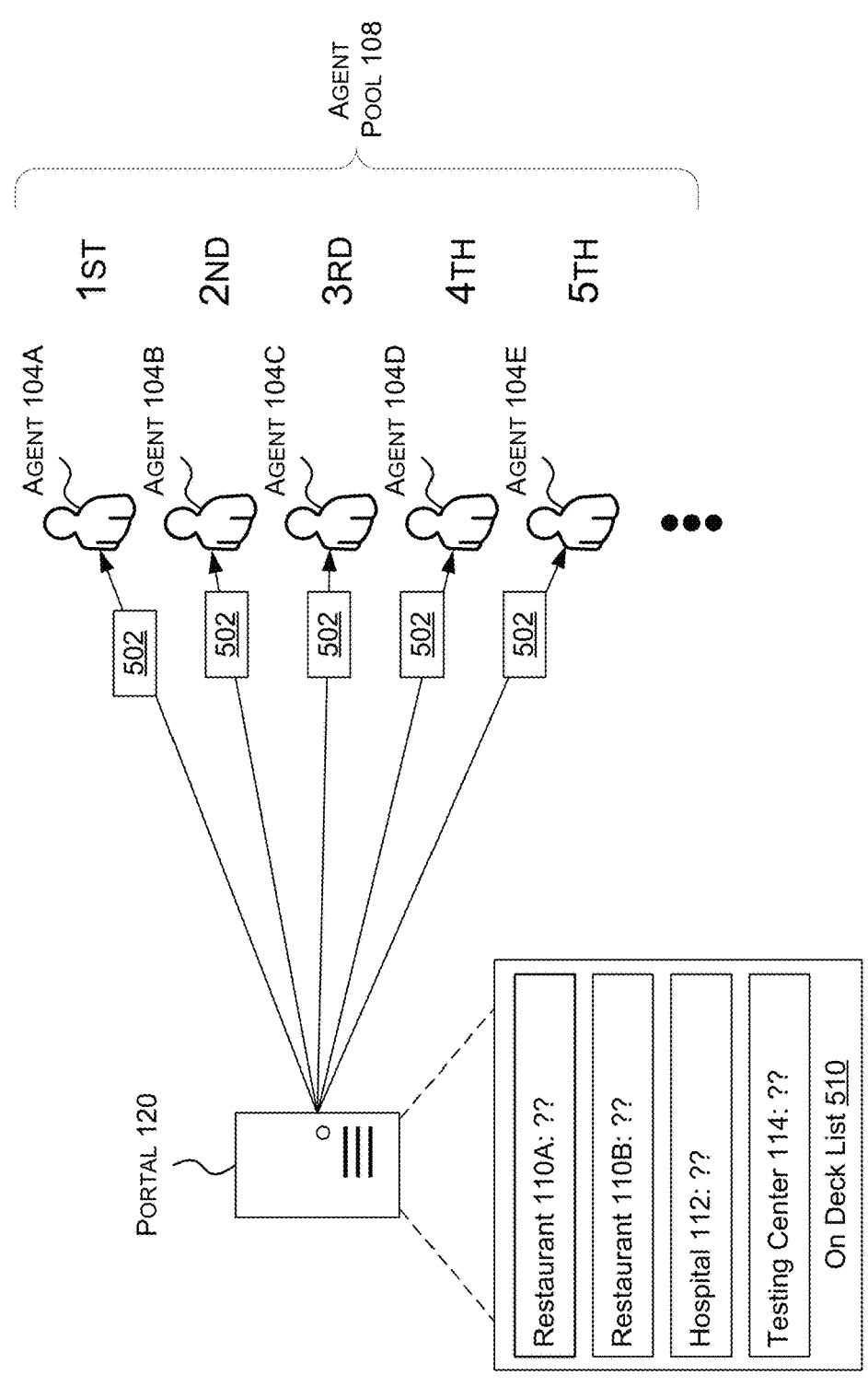
FIG. 5A illustrates soliciting agent availability for a particular organization.

FIG. 5A illustrates soliciting agent availability for a particular organization. In order to connect an agent to a station in a timely manner, on-deck list 510 maintains a list of agents that are available to engage with a station 210 of a particular organization. This on-deck list 510 is also referred to herein as a pool of available agents. As illustrated, on-deck list 510 is empty, indicating that portal 120 has not yet found any agents that are available to work with any of the listed organizations. FIG. 5A Also illustrates the ordering of agents 104 in agent pool 108. Agent 104A is first in line, followed by agent 104B, etc. All else being equal, an agent that is closer to the front of the line will be put on-deck sooner than an agent that is closer to the end of the line.

The order of the agents can be based on a first-in-line or first-in first-out order. The order of the agents can be based on performance metrics as well. For example, if a first agent has a proven history of being more available than a second agent, the system may prioritize the first agent over the second agent. Similarly, if the first agent has timing metrics with respect to a particular set of orders that indicate a higher level of efficiency than timing metrics of other agents, that first agent may be prioritized over the other agents in the pool.

FIG. 5A illustrates portal 120 sending out availability inquiry message 502 to a number of agents. Availability inquiry message 502 asks if the agents 104 are available to be on-deck for a particular restaurant 110A. As indicated in FIGS. 5A, each restaurant entry of on-deck list 510 indicates that no agents are listed in these pools.

Figure 5B:
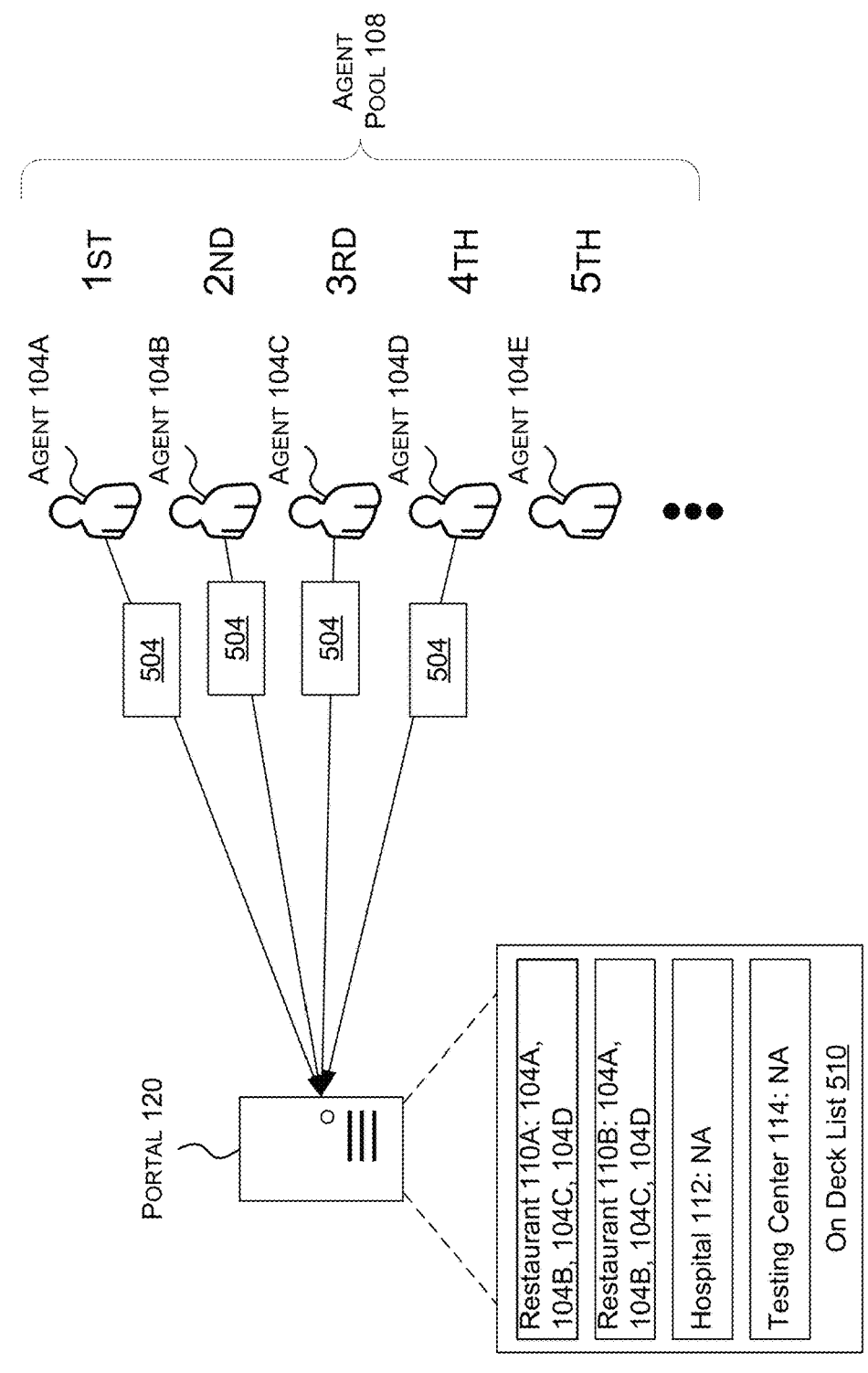
FIG. 5B illustrates receiving an availability confirmation.

FIG. 5B illustrates receiving an availability confirmation. As illustrated, portal 120 receives confirmation messages 504 from agents 104A, 104B, 104C and 104D. This indicates that these agents agree to be the on-deck agent for the first two restaurants 110A and 110B. This means that these agents will be assigned to the pool of agents of the first restaurant 110A and the second restaurant 110B. When the agents are put on-deck for an organization with multiple locations, agents 104A, 104B, 104C and 104D may be assigned to assist end users (customers) from any of these locations, greatly expanding the number of end users the agents may assist. As a result of receiving confirmation messages 504, the first and second restaurant entry of on-deck list 510 has been updated to store a reference to agents 104A, 104B, 104C and 104D. In this example, none of the confirmation messages indicated anybody for the hospital or testing center.

Figure 5C:
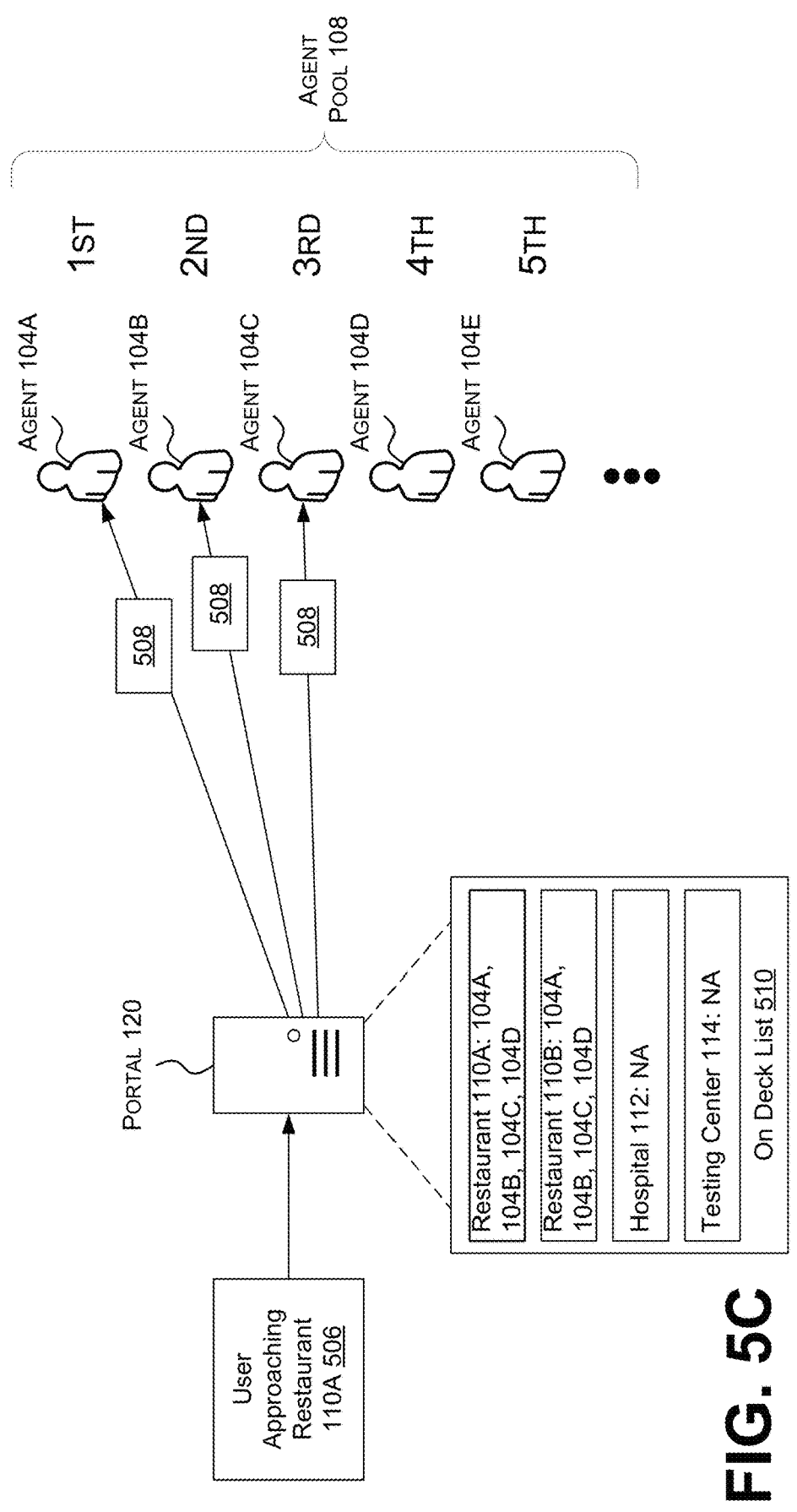
FIG. 5C illustrates receiving an indication that a user is approaching an organization.

FIG. 5C illustrates receiving an indication 506 that a user is approaching a queue within an organization. For example, with reference to FIG. 2, user 220B may have left queue 218B, leaving it empty. Then, another user 220A may have entered queue 218B. The approach of user 220A may be identified by sensor 230, a camera 219 on station 210, or any of the other techniques described herein.

FIG. 5C also illustrates messaging to the on-deck agents for the location that is associated with the indication 506. In this part of the process, the system can send a predetermined number of work requests 508 to agents that are available for that location. In this case, the on-deck list indicates a pool of agents that are available for that one particular location and a predetermined number of work requests are sent to those agents. In this example, the predetermined number of agents is three, thus Agents 104A, 104B, and 104C each receive a work request 508. The work requests are sent in response to the indication 506 that a user is approaching a queue within an organization. Agents 104A, 104B, and 104C are at the top of the agent pool for that one location, and as such are considered first. According to training 304A and availability, agent 104A is trained to work with users of a particular restaurant 110A. Therefore, these agents are given the first opportunity to sign up as the selected agent for restaurant 110A.

Figure 5D:
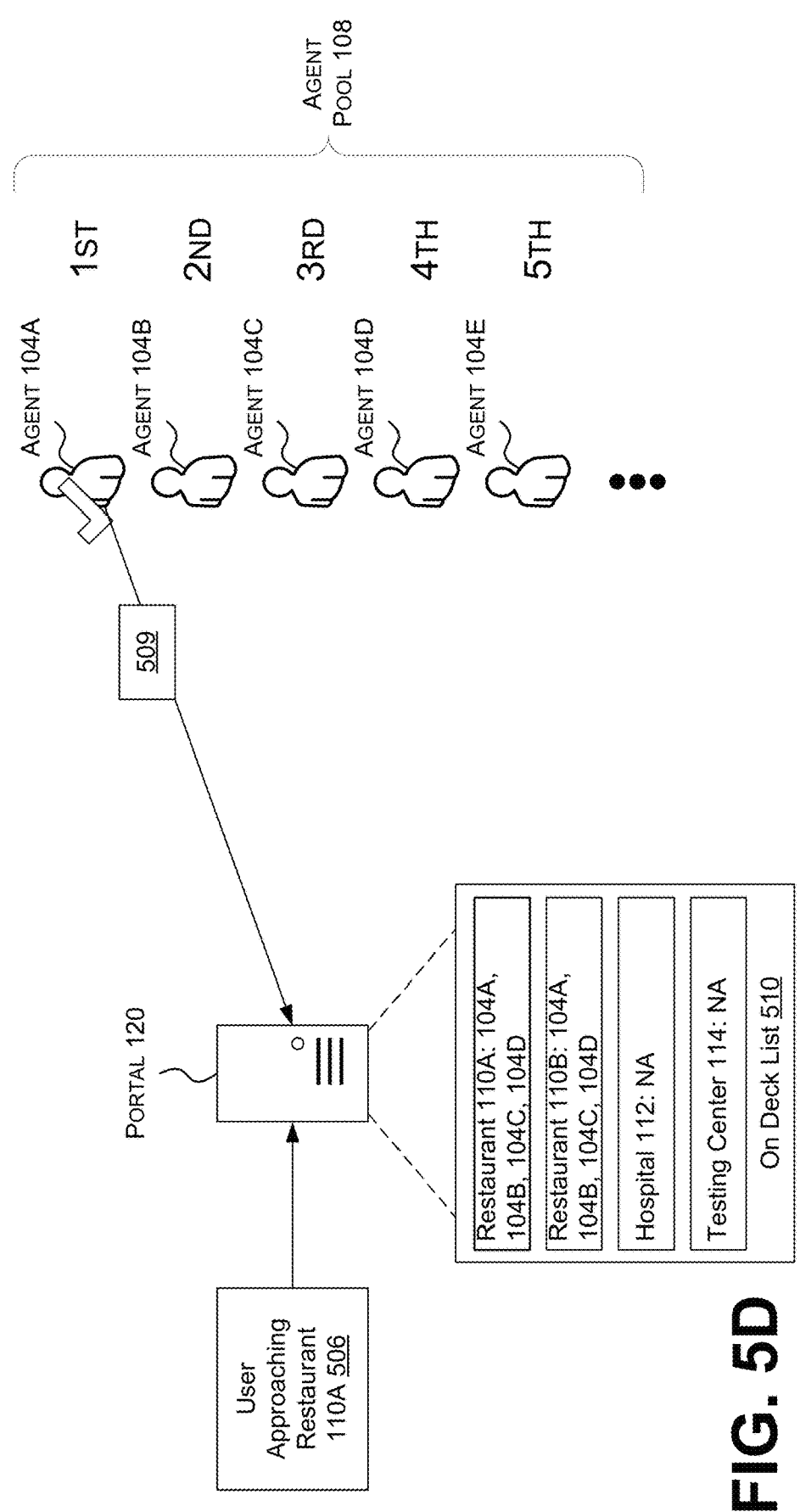
FIG. 5D illustrates messaging the agent to get ready for the approaching user.

FIG. 5D shows how one of the agents is selected. After the work requests are sent to the predetermined number of agents, each agent has an opportunity to send a response 509. The first agent that responds to a work request is selected as the selected agent for the queue where the approaching end user is located. In this example, the first agent 104A responds first, and thus is selected as the agent for that queue.

Figure 5E:
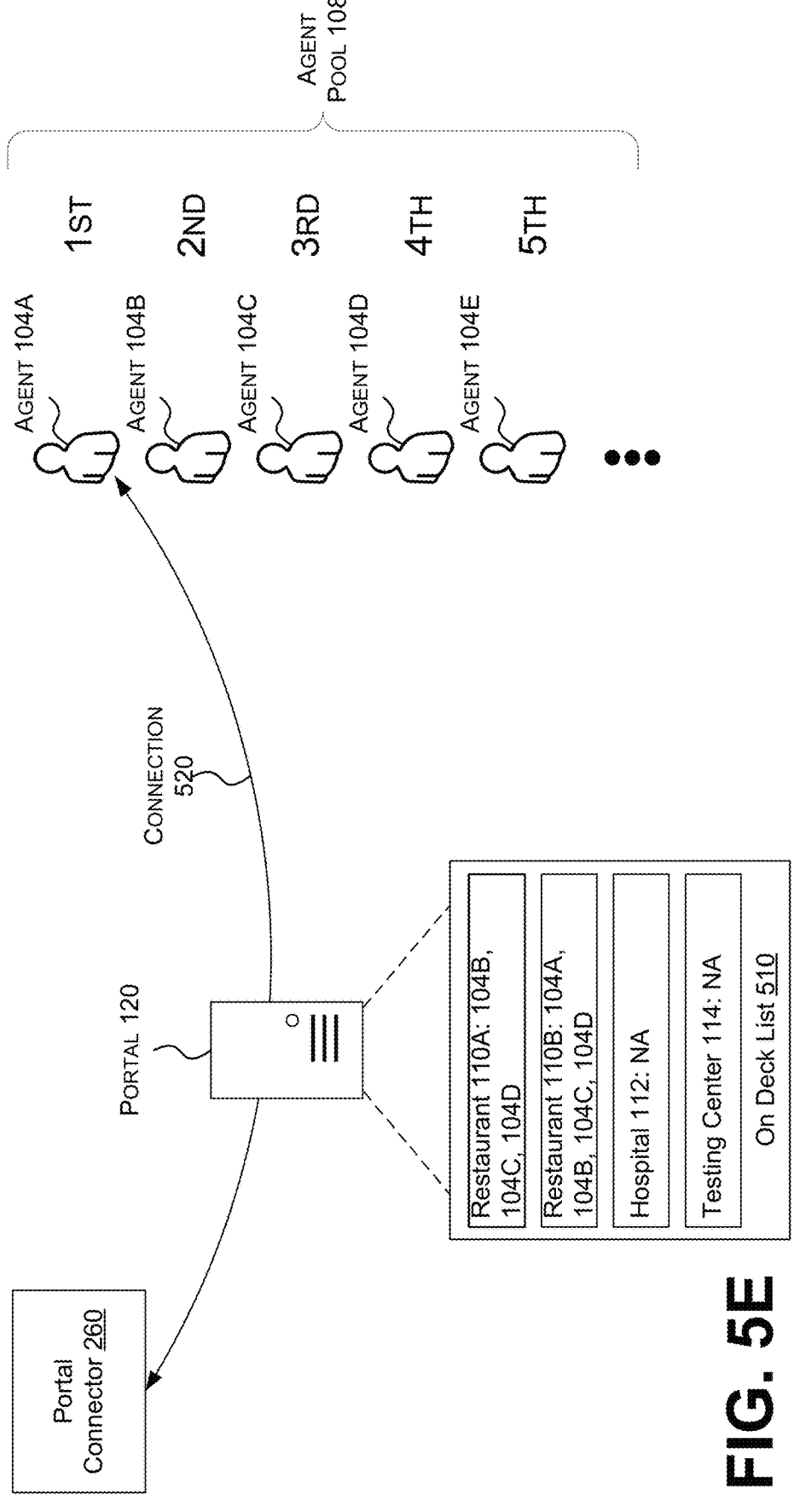
FIG. 5E illustrates creating a connection between the agent and the portal connector on-site.

FIG. 5E illustrates creating a connection between the selected agent and the portal connector on-site. Connection 520 may be a secure connection between the computing device used by the selected agent 104A to portal connector 260, which is on-site where the agent 104A will take the order. Once the first agent 104A is connected to portal connector 260, that person may be removed from the pool of available agents for that location. This removal of the first agent 104A is indicated in the list 510 of FIG. 5E. Portal 120 may begin soliciting another on-deck agents 104 for restaurant 110A, so that if another queue needs attention, other agents, such as Agents 104B, 104C or 104D, can be selected using the same process of sending a predetermined number of work requests and selecting the agent with the first response.

Figure 5F:
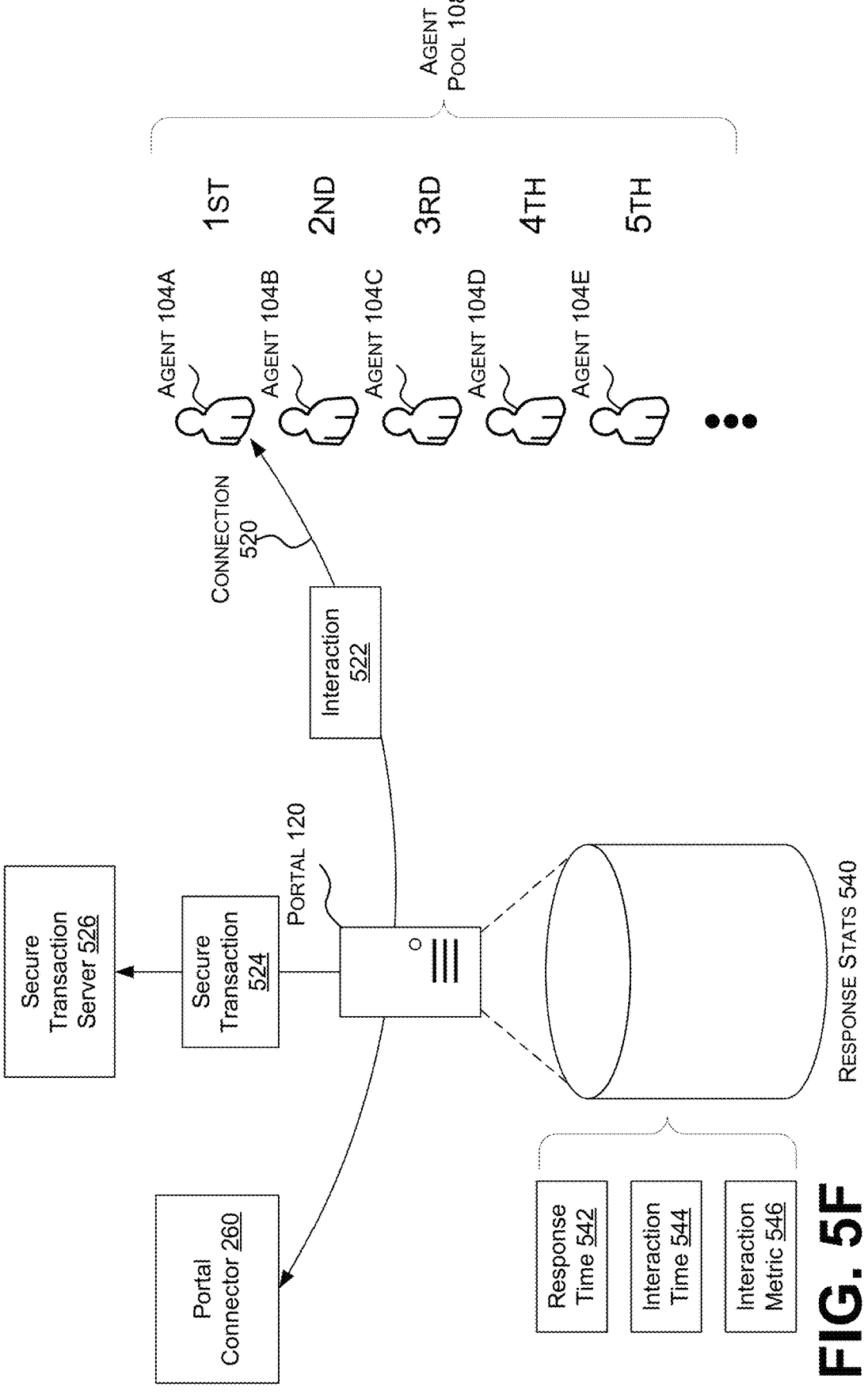
FIG. 5F illustrates a secure transaction routed from the portal connector through the portal to a secure transaction server.

FIG. 5F illustrates a secure transaction 524 routed from the portal connector 260 through portal 120 to a secure transaction server 526. FIG. 5F also illustrates interaction 522 between agent 104A and a user 220. Interaction 522 is any conversation, spoken, written, or verbal, between agent 104A and user 220. Allowing interaction 522 to be transmitted to agent 104 while ensuring that secure transaction 524 goes directly to secure transaction server 526 allows agent 104A to use their own computing hardware without risking exposure of user 220's personal financial data.

FIG. 5F also illustrates metrics that are captured over the course of interactions between agent 104A and user 220. For example, response time 542, interaction time 544, and interaction metric 546 are stored in response statistics database 540. Response time 542 refers to how long it took the agent to first speak with the user. Lower is better. Interaction time 544 refers to how long it took for the order to be completed. Lower is better. Interaction metric 546 is any measure by which agent 104 may be judged. For example, the dollar amount of an order or inclusion of specific promotions or add-ons may be noted. These statistics may be used to give preference to better performing agents, e.g., higher agents can be placed first in a pool or on-deck lists.

FIG. 6A illustrates skipping an untrained agent while soliciting availability for an organization. FIG. 6A illustrates determining the on-deck agent for testing center 114. Agent 104A has already begun interacting with users at a station in restaurant 110A, and as a result has been removed from the top of agent pool 108. FIG. 6A also illustrates skipping agent 104B, who is now at the top of agent pool 108 but who has not been trained to assist users at testing center 114.

Figure 6B:
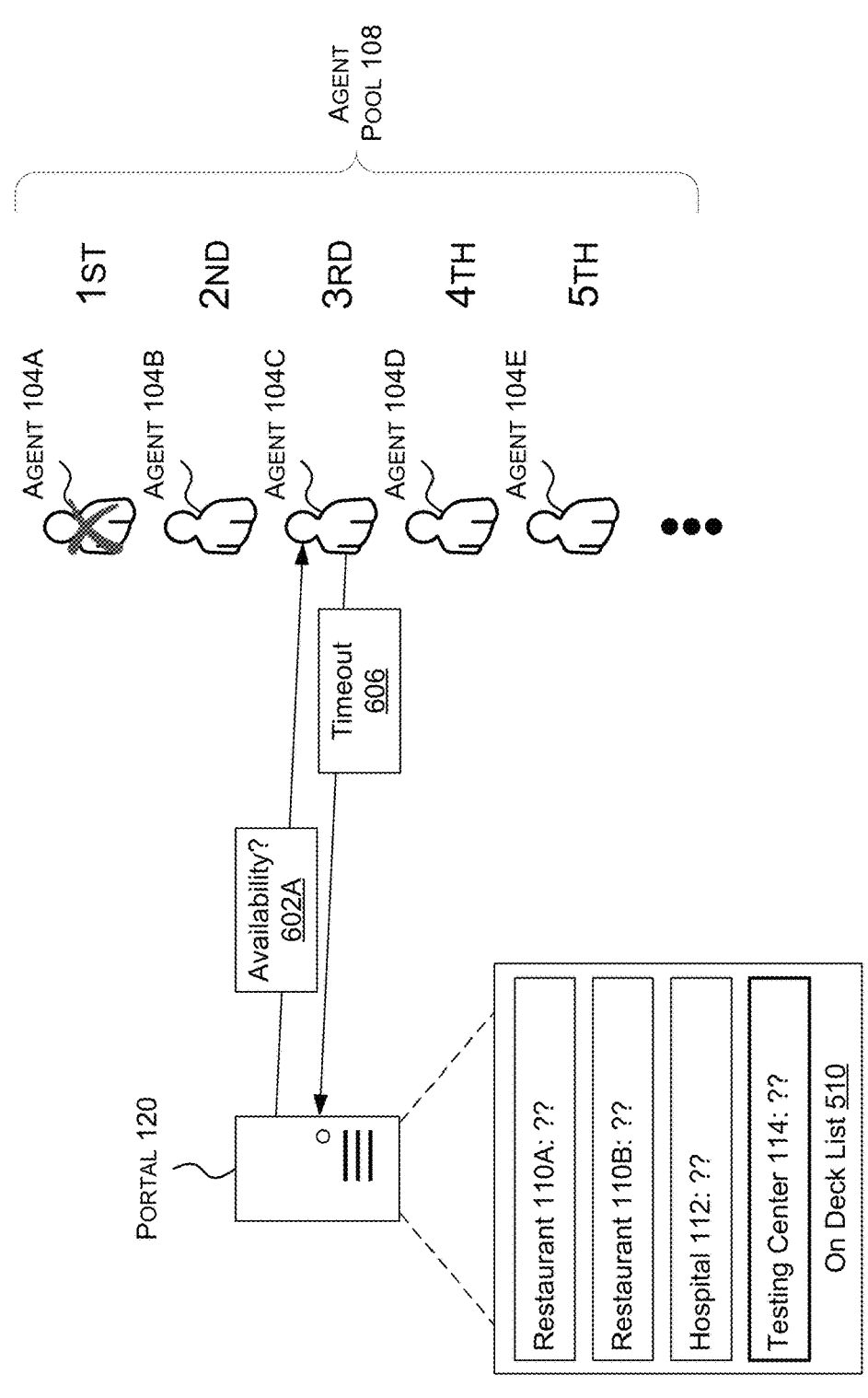
FIG. 6B illustrates soliciting agent availability for an agent trained for the organization and receiving a time-out.

FIG. 6B illustrates soliciting agent availability for an agent trained for the organization and receiving a time-out. After skipping agent 104B, availability inquiry message 602 is sent to agent 104C. However, agent 104C is unavailable at the moment. For example, agent 104C may be out to lunch. As a result, a timeout message 606 is sent by agent 104C's computing device to portal 120, indicating they are not available. In some configurations, agent 104C retains their place in agent pool 108, although they may also be demoted or removed.

Figure 6C:
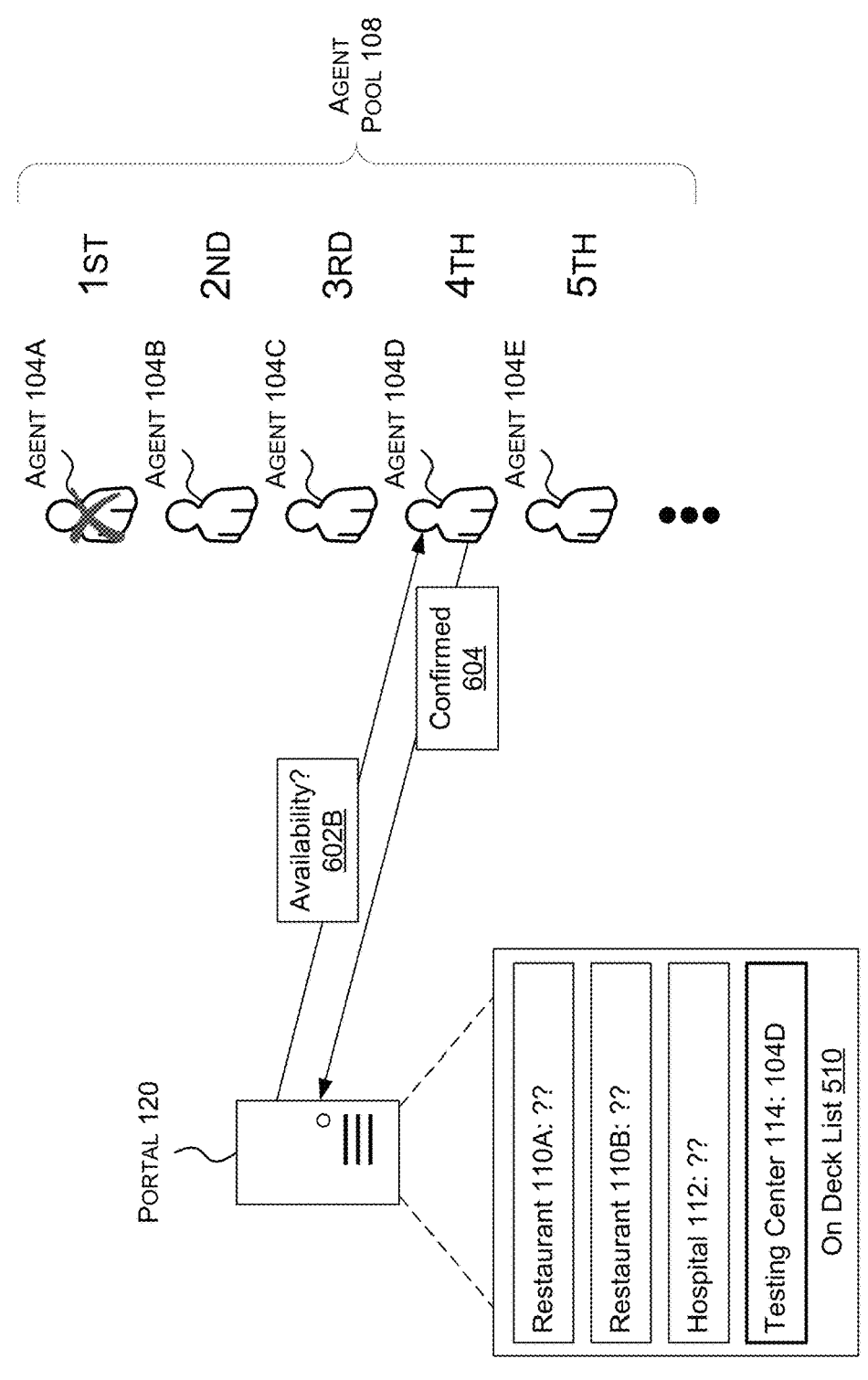
FIG. 6C illustrates soliciting agent availability for the next trained agent in the pool.

FIG. 6C illustrates soliciting agent availability for the next trained agent in the pool. Availability inquiry message 602B is sent to agent 104D, similar to the availability inquiry message 502 discussed above in conjunction with FIG. 5A. Agent 104D may agree to be the on-deck agent for testing center 114, causing confirmed message 604 to be sent to portal 120. Upon receiving confirmation message 604, portal 120 may set agent 104D as the on-deck agent of testing center 114.

Figure 7A:
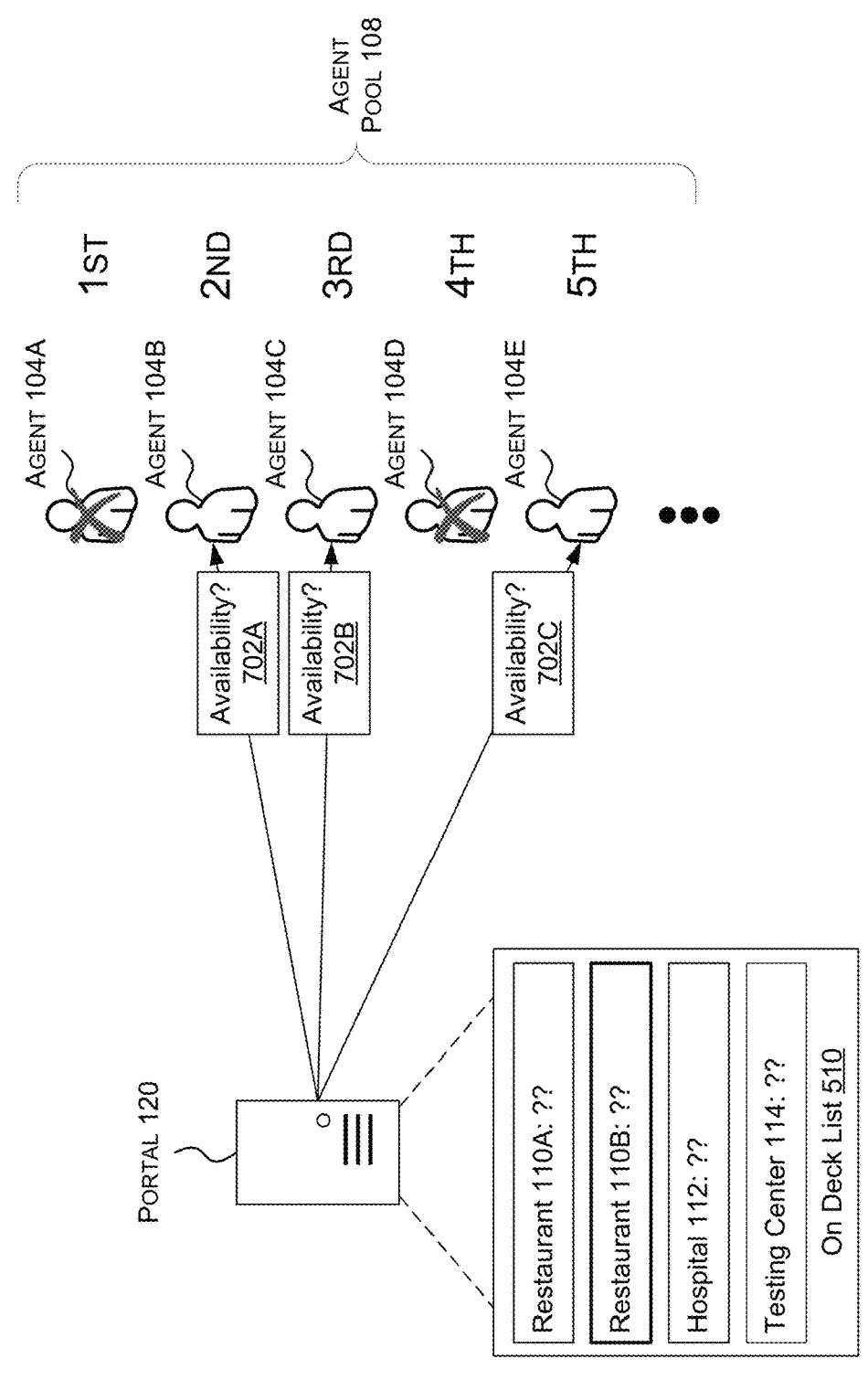
FIG. 7A illustrates soliciting agent availability from three agents at the top of the agent availability pool.

FIG. 7A illustrates soliciting agent availability from three agents at the top of the agent availability pool. Agents 104A and 104D have already been selected as on-deck agents, and as such are removed from the top of available agent pool 108. In order to improve responsiveness, portal 120 may send out multiple availability inquiry message 702 to multiple qualified agents 104 at the top of available agent pool 108. While FIG. 7A illustrates 3 such messages, any other number of messages is similarly contemplated. FIG. 7A illustrates attempting to set the on-deck agent for restaurant 110B, which agents 104B, 104C, and 104E are certified to work with.

Figure 7B:
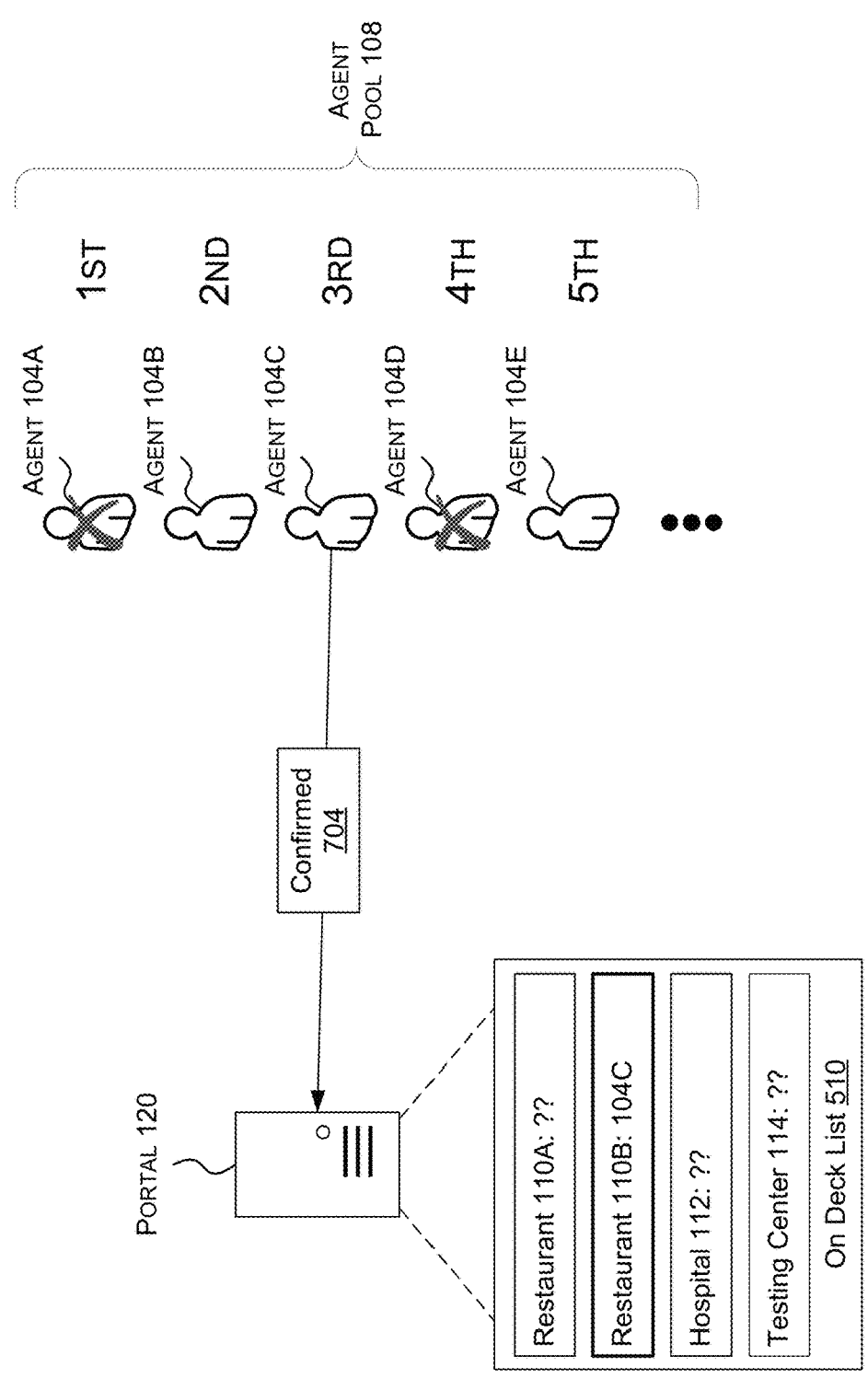
FIG. 7B illustrates setting the agent to the agent that returned the first confirmation.

FIG. 7B illustrates setting the on-deck agent to the agent that returned the first confirmation. Agent 104C responds first with confirmation message 704. This establishes agent 104C as the on-deck agent for restaurant 110B. On-deck agent 104C will be connected to a station at one of the locations of restaurant 110B at the appropriate time, similar to the discussion above in conjunction with FIG. 5E.

Figure 8A:
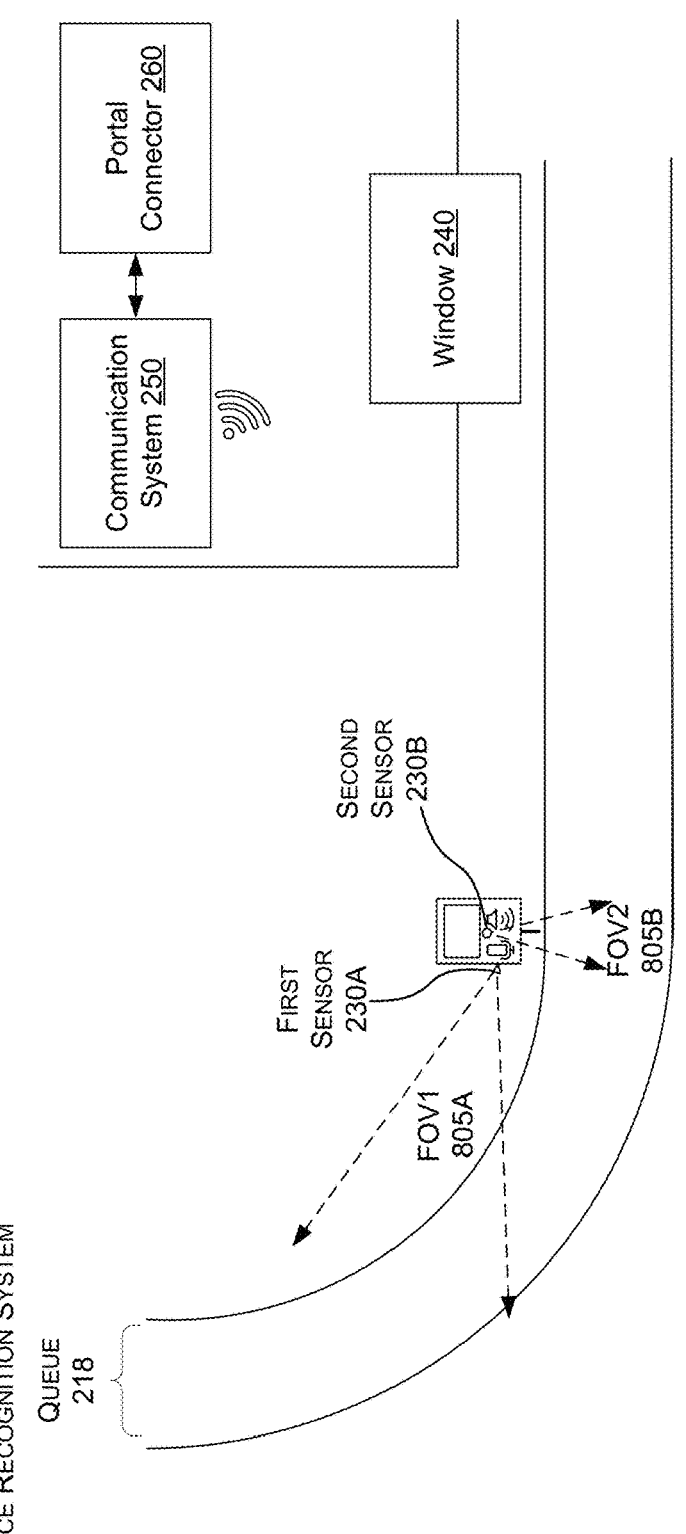
FIG. 8A illustrates an overview of a drive-thru restaurant utilizing license plate and facial recognition to aid off site agents in taking a user's order.
Figure 8B:
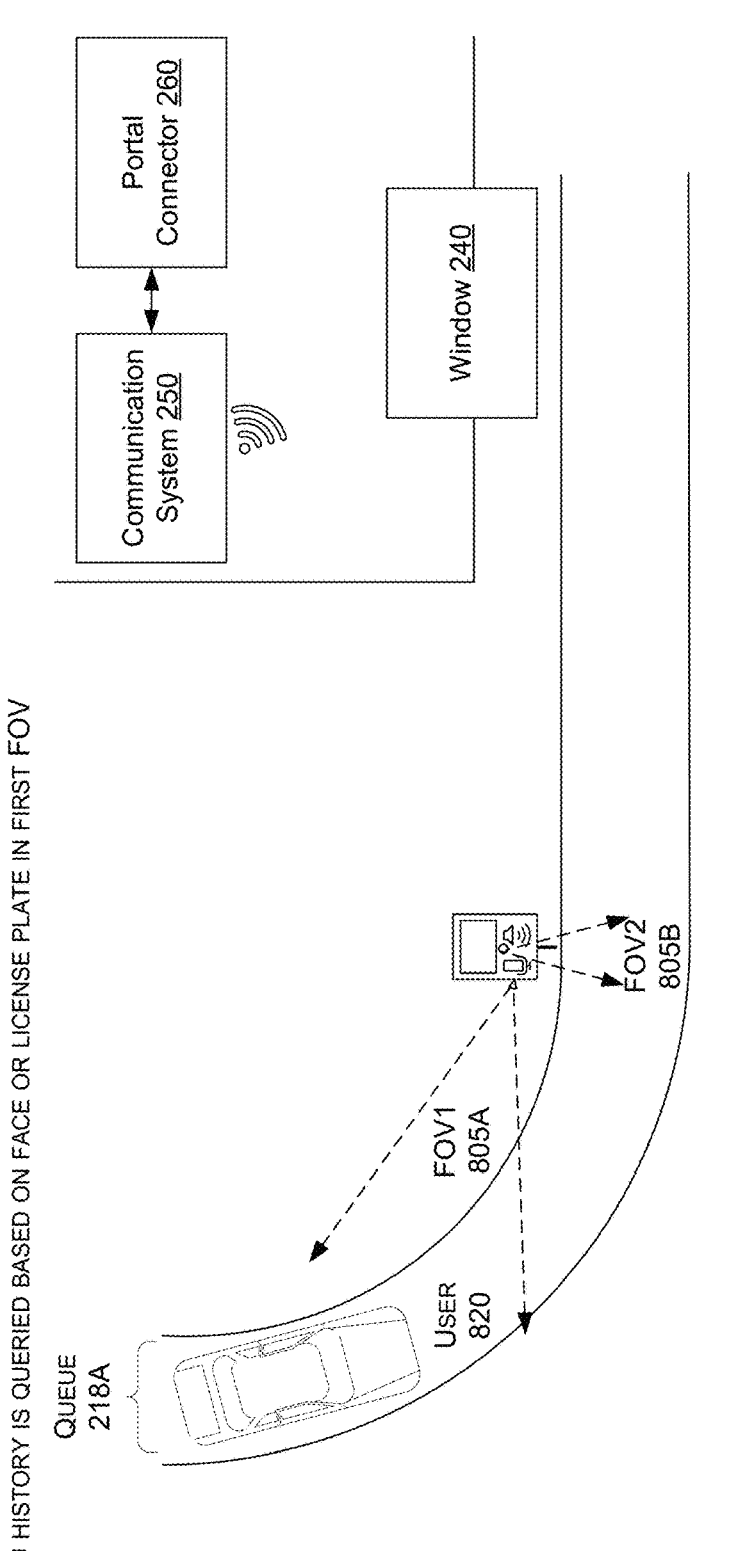
FIG. 8B illustrates a display notification an agent receives based on FOV1 when taking a user's order.

Turning now to FIG. 8A, a system for utilizing license plate information and/or facial recognition for generating order recommendations is shown and described below. In this example, a station can include two sensors 230 that each include a field of view 805 (FOV). The first sensor 230A can be positioned and oriented such that the first FOV 805A is directed toward a queue 218. The second sensor 230B can be positioned and oriented such that the second FOV 805B is directed away from an ordering station and directed toward the front of the queue. As shown in FIG. 8B, when the user 820 reaches a predetermined location in the queue, e.g., where the first FOV 805A (FOV1) is in a position where a camera can capture the user's face and/or license plate, the system can determine an identity of the user. Using the identity, the system can retrieve the user's order history and other preferences. As shown in FIG. 8C, the user's order history and preferences are then displayed on a screen in front of an agent when the user moves into the second FOV 805B (FOV2). Thus, the two sensors are used to (1) retrieve the user's order history and preferences, then (2) display the user's order history and preferences to an agent only when the user is in front of the station.

In some embodiments, the display of the order history and preferences may only be displayed to an agent's computer when the user, e.g., the customer, is in front of the station and the user is identified by the system, e.g., by use of the system's facial recognition or license plate recognition. In addition, the order history and preferences may only be displayed to the display screen of the station when the user is in front of the station and identified by the system. The order history and preferences are not displayed if the user is not identified and in front of the station in the second FOV. This way, stations with multiple queues will increase their accuracy in aliening orders with customers and the customer's privacy is improved by only displaying a user's order history and preferences to identified users. User privacy could be an issue when there is a system with two or more rows of cars and they interweave into a single row prior to reaching a station. This multi-sensor setup increases the speed and accuracy of each person's order as well as improving privacy and security features of a system.

In any of the disclosed embodiments, the system can apply different priorities to each queue for agent assignments based on a type of queue. There are several different types of queues, which can include, but is not limited to: a drive-thru queue, a counter queue, and a teleconferencing queue. The drive-thru queue can include any type of setup that serve customers in their motor vehicles. The counter queue can include any type of setup that serves customers in a building. The teleconferencing queue can include virtual meetings or phone calls from customers arranging a delivery or a pickup. In one embodiment, all types of queues have the same priority when agents are assigned. The agents are assigned to each queue on a first come, first served basis regardless of the type of queue that customers are detected. In other embodiments, the algorithm assigns a different priority to each type of queue. For instance, the system may prioritize a drive-thru queue over a teleconferencing queue, and prioritize the teleconferencing queue over a counter queue. In such an example, when a customer approaches a drive-thru, the assumption is that the user is in a hurry. Whereas a customer at a counter or a customer on a phone may not be in as much of a hurry compared to customers in a car. Thus, in such embodiments, if there are multiple customers waiting in each queue, the system would assign an available agent to drive-thru queue before the other types of queue.

To facilitate some of the above-described embodiments, a hardware sensor is used at the counter queues and/or the drive-thru queues. In such embodiments, the MQTT protocol may be used to notify agents that a user is present at a restaurant drive-thru or front counter. Eligible agents are informed in response to the detection of an end user and an audio system starts an audio connection between the current customer and the agent.

Agents may be selected and allocated to a particular queue in response to the detection of an end user entering a queue. When an end user approaches the queue, a sensor detecting the presence of the end user can cause the system to send work requests to a predetermined number of available agents. For instance, a number of available agents can be prioritized in an agent pool. Those agents can be prioritized using one or more factors including, but not limited to, performance metrics, first-in-line ordering, etc. In one illustrative example, if an available agent pool has five hundred available agents, the system may send work requests to the first three available agents based on their priority. The system can be configured to receive confirmations from each agent that receives a work request. The first available agent that provides a confirmation is selected as the primary agent that is to communicate with end users located at the queue.

Once an agent has been assigned to a queue, the agent is removed from the agent pool in response to the detection of a predetermined event. The agent may be connected to the system to communicate with an end user in the queue and provide services for the end users in the queue until the queue empties. When the system determines that a queue is empty, e.g., there are no more cars in the drive-through line, the agent is removed from the queue and the system disconnects the agent's communication with a communication station associated with the queue. When an agent is removed from a queue, that particular agent may be returned to the agent pool. When an agent is returned to the agent pool, in some embodiments, those agents are prioritized according to their performance metrics, or they may be positioned at the end of a line when a first-in-line model is utilized. An agent may also request to leave the queue. In such scenarios, the system can utilize the above-described process to select a new agent from the available agent pool before the agent is released from the queue.

In some embodiments, a system can control a position for each end user, e.g., each customer, within a queue. For example, for a teleconferencing queue, an end user may opt out of the queue for a predetermined amount of time, if they need more time to decide what to order. The system can receive an input from the end user, e.g., a voice command or a manual input to an input device, indicating an inactive status for the queue. The input can include a time for the inactive status. In some embodiments, the inactive status can be invoked in response to the system detecting a pause in communication. A detected pause for a predetermined time period causes a user to move into an inactive status for a time period, an "indicated time." In one specific example, an active period can be a predetermined time period, e.g., 5 minutes. The system can re-insert that end user into the queue after the indicated time has passed.

While the end user is in an inactive status, the system can send a prompt to the end user, prompting the end user to provide an updated status. In response, the system can receive an update indicating the end user wants to continue in the queue, or system can receive an update indicating the end user wants to drop from the queue. The user can choose to remain in the queue or opt out entirely. The prompt can be sent in response to one or more events. The event can include detection of the end user being in a next-in-line position, e.g., second place in line.

The system can also provide agent training tools and agent management tools. These tools include customized online courses and systems for monitoring the progress of each agent taking the online courses. The system monitors the progress of each agent, and automatically grants permissions for each agent to join an agent pool or one or more queues of a particular organization or certain queues within an organization based on the completion of predetermined training milestones. The system provides online courses that allow the agents to become trained for specific locations, e.g., specific restaurants. This allows organizations to require specific courses for a particular location, a specific queue, or a specific set of queues. The online courses provide simulated customer-agent interactions that allow the agents to practice orders using actual menus used at particular locations.

The system also automatically measures several performance metrics for the online courses, including speed and accuracy metrics for simulated orders. The system also automatically upgrades a user's skill level to more complex orders as the agent learns the software. When an agent meets a threshold performance metric for a course required for a location or a queue, that agent is allowed to join a pool for that location or a specific queue for a particular location. Then, that agent is eligible to be selected to interact with end users, e.g., customers, by the use of the other queuing techniques disclosed herein. By the use of these tools, before any agent's first shift, they have already learned the menu, practiced taking orders, and developed the trained reactions for a particular location. This system allows for scalability as well, since a large number of agent candidates can be trained and managed using automated training methods.

The training tools also provide administrative features that allow admin users, e.g., location managers, to oversee agent pools. The system provides a user interface (UI) that shows lists agents who have completed predefined training tasks and who have been added to agent pools for a particular location. This UI allows a manager to see which agent is available for a pool, and tools for allowing the manager to assign agents to pools, or allows the manager to confirm agents who are recommended to specific pools. In one illustrative example, consider a scenario where there are 20 restaurant locations for a single pool. The management user interface can show agent pools and individual lobbies that are each associated with individual restaurants within an organization. Each lobby can show specific agents that are associated with a specific admin user, e.g., a manager, and each lobby can be associated with a specific location. In such an example, there might be 20 different lobbies, one lobby per franchise rather than one lobby for an entire company.

The system can generate a UI showing information about each agent and their association with any assigned queues. The UI can also show representations of individual locations, e.g., restaurants, and stations within each location for each manager. A station is a point of contact for a particular queue. For instance, on a drive-thru, a station is the point at which a customer's vehicle reaches a camera and microphone. This system allows the managers to oversee a large number of organizations, locations, and individual stations at each location.

The system grants each manager permission to access each agent profile. This allows each manager to oversee a station if any issues arise. For example, the system can provide a manager with an input control that removes an agent's from a particular station if the agent is having connectivity issues or if they are encountering other customer interaction issues. Managers can remove agents from a queue or add agents into a queue. The system can provide a notification to a manager if a minimum threshold of agents is reached, e.g., there are not enough assigned agents in a queue. A minimum threshold is the number of agents needed in a queue to ensure that the system is operating as efficiently as possible. The agents can be manually added to a queue, or the system can automatically allocate agents as needed to fulfill a minimum threshold of agents. The system can also allow managers to approve or decline any new agent that is automatically added to a queue.

By dynamically connecting agents to a queue and disconnecting agents in response to particular events, a system can provide a seamless, consistent customer service experience while allowing an organization to maintain a reduced number of active agents versus a number of agents that is normally required by traditional drive-through systems. For example, by the use of the techniques disclosed herein, a restaurant chain can staff 20,000 individual franchise locations using 5,000 to 15,000 agents who are dynamically allocated and re-allocated to queues at each location. This can greatly improve efficiency and utilization of a number of resources, including human resources and computing resources, versus traditional systems. Traditional systems require at least one agent fully dedicated to each franchise location, and traditional systems can involve processes where each agent and their associated systems have hours of idle time per day. Additionally, the same pool of agents is used for all the different types of agent queues, further improving the efficiency of these organizations.

In some configurations, a pool can be assigned to a select set of queues. This can include all queue types, e.g., counter queues, drive-thru queues, and teleconferencing queues. In addition, the pool can be assigned queues at different site locations. This allows agents assignments to jump from city to city within the same organization or even within different companies. This allows a group of agents to serve in queues and locations where they are needed most and times where they are needed. For example, an agent may take an order at a pizza shop in Oakland, CA from a front counter, then be immediately reassigned to take an order at an Italian restaurant in Arlington, VA from a drive-thru. These features allow managers to assign agents to queues and locations and companies based on their trained skillset. In addition, the disclosed features also allow managers to utilize a smaller number of agents to service locations in different time zones. This allows one set of agents to work with several workload waves, e.g., multiple lunch rushes. In another example, a single company, for example, a mom-and-pop restaurant with one location, can be put in the same queue as other similar shops. The agents provide an opportunity for these organizations to greatly reduce the number of people needed to staff a smaller company. For example, instead of needing ten people for ten locations, a manager could have three people running those ten locations, even though the locations are associated with different companies.

Figure 9:
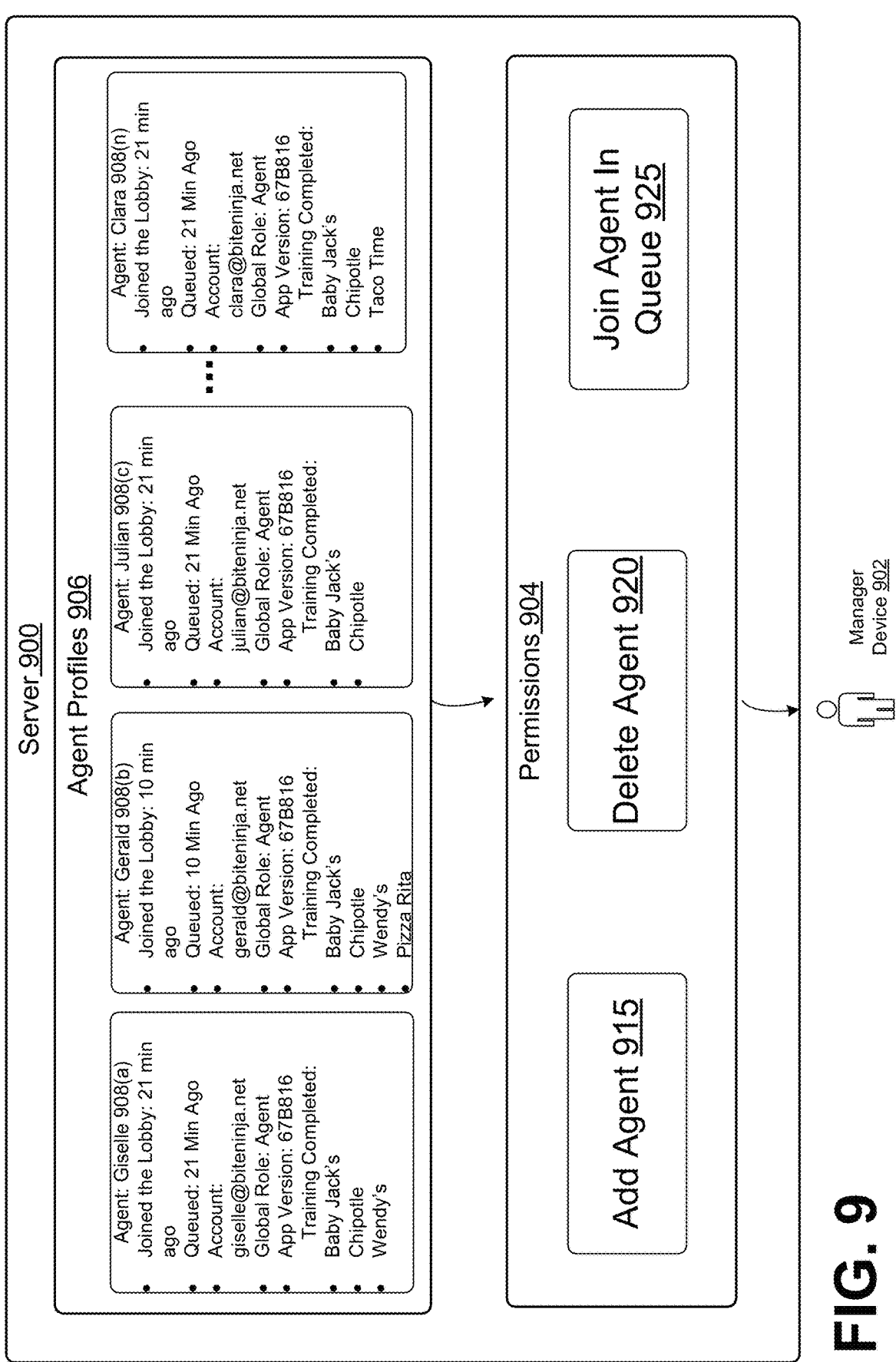
FIG. 9 illustrates the agent profiles and permissions a manager device views when overseeing a lobby.

FIG. 9 illustrates aspects of a training and management tool for users who are overseeing a number of agents and a number of locations. In this example, the system displays a "lobby" to an admin user, e.g., a manager of agents. The lobby can include profiles and permissions for each agent that is associated with a particular manager. The agent profile 906 provides information such as the name of the agent, when the agent joined the lobby, when the agent was last queued, the agent's account information, the agent's role, and the training that the agent has completed. The system sets permissions for a manager device 902 that can display the profiles. The manager device 902 has access to this information throughout the course of the agent's shift. Additionally, the manager device 902 handles permissions 904 that help manage the agents throughout their shifts. In one configuration, these permissions include adding an agent 915, deleting an agent 920, or joining the agent in the queue 925. An agent may need to be added to the lobby if the number of agents does not meet the minimum threshold required for the queues to run in an efficient manner. An agent may be deleted from the lobby if there are more than a threshold of agents for a queue, and/or if there are too many agents in an idle state, e.g., not actively connected to a station. Thus, the system can remove agents from a lobby if or a pool if a number of agents have more than a threshold amount of idle time. In another example, the system can allow the manager to monitor customer-agent communication. If the manager notices that an agent is having technical difficulties or struggling with an order, and they may need to join the agent in the queue to assist with the order.

Figure 10A:
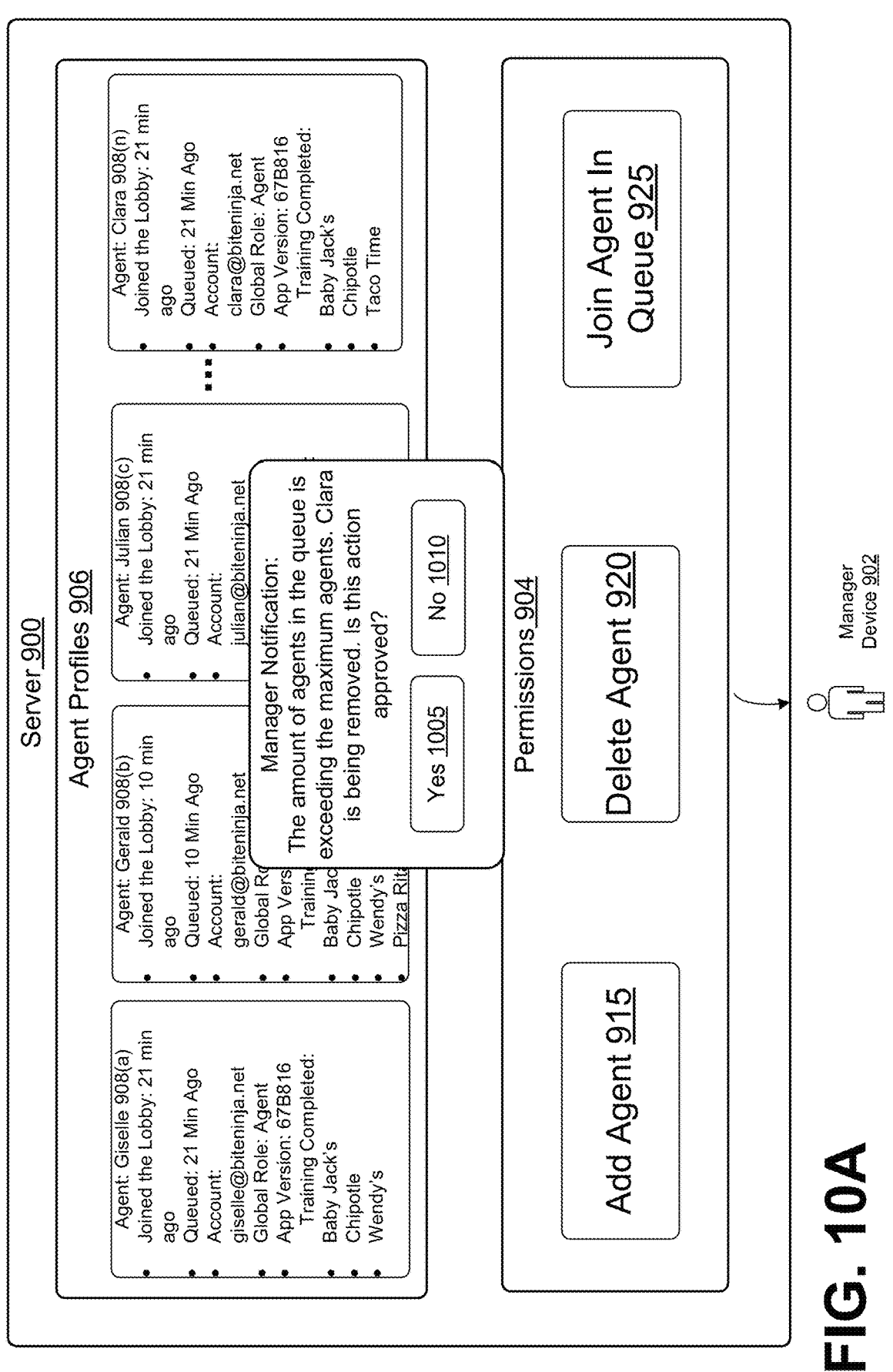
FIG. 10A illustrates a display notification a manager receives when the number of agents exceeds the maximum needed for the queue.

FIG. 10A illustrates a notification 1000 that can be displayed on a manager device 902 when the number of agents exceeds the maximum needed for the queue. In this example, the system detects a scenario where there are too many agents in a lobby. This notification indicates that a particular agent, e.g., Clara, is being removed from the lobby. The manager device 902 has the option of confirming this recommendation or declining the recommendation. The system can also automatically remove the agent without providing a recommendation and requiring a response.

Figure 10B:
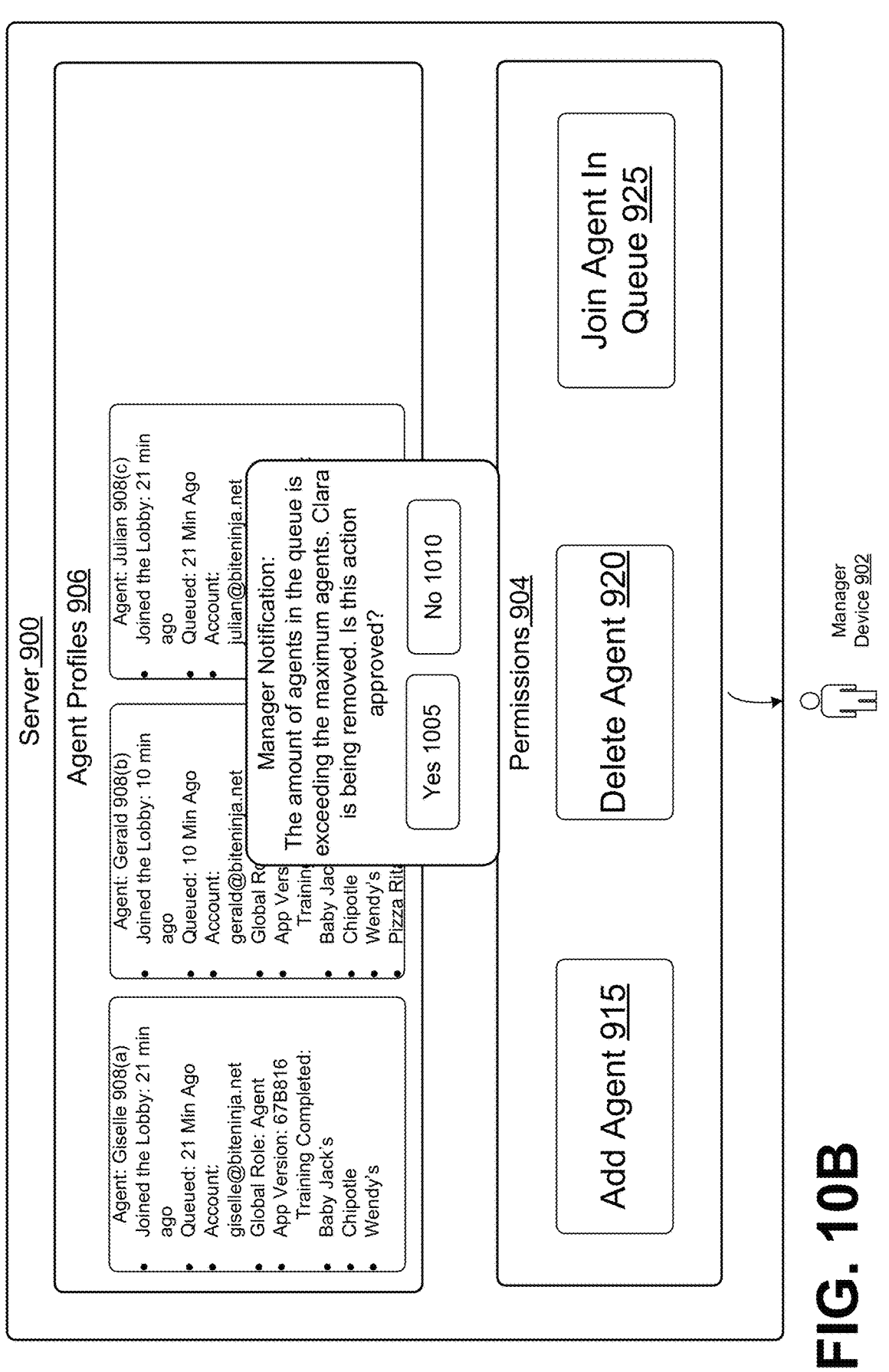
FIG. 10B illustrates a manager approving the action the system requests, effectively removing an agent from the queue.

FIG. 10B illustrates an example of the user interface where a user of the manager device provides an input approving the recommendation of removing an agent. In response to the input, the manager device removes the agent from the lobby. The system is now configured to select agents for one or more queues only using remaining agents who are listed as members of the updated lobby. The removed agent may be added to a different lobby to accommodate a location or other manager with a higher demand.

Figure 11A:
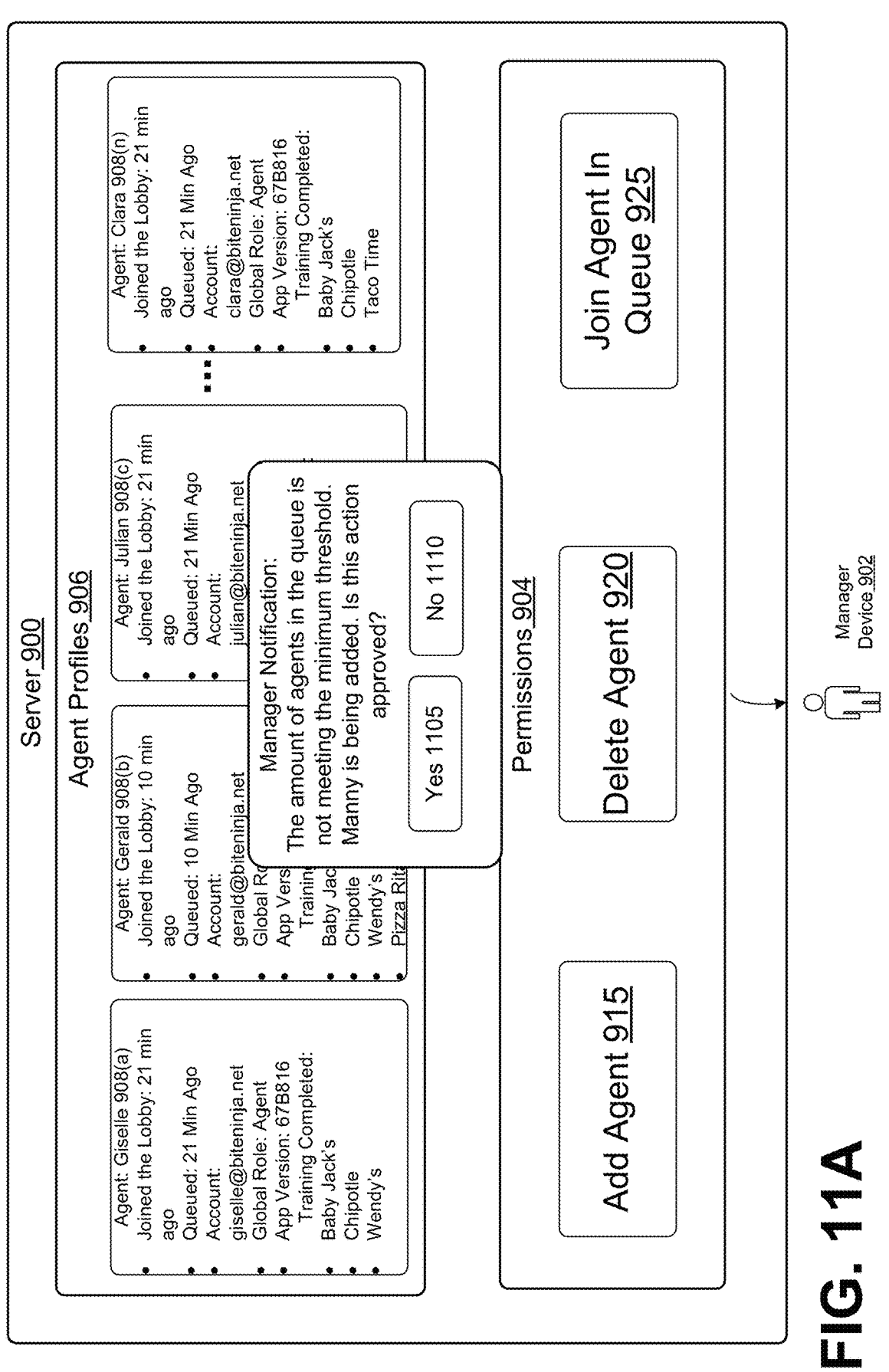
FIG. 11A illustrates a display notification a manager receives when the number of agents is not meeting the minimum threshold needed for the queue.
Figure 11B:
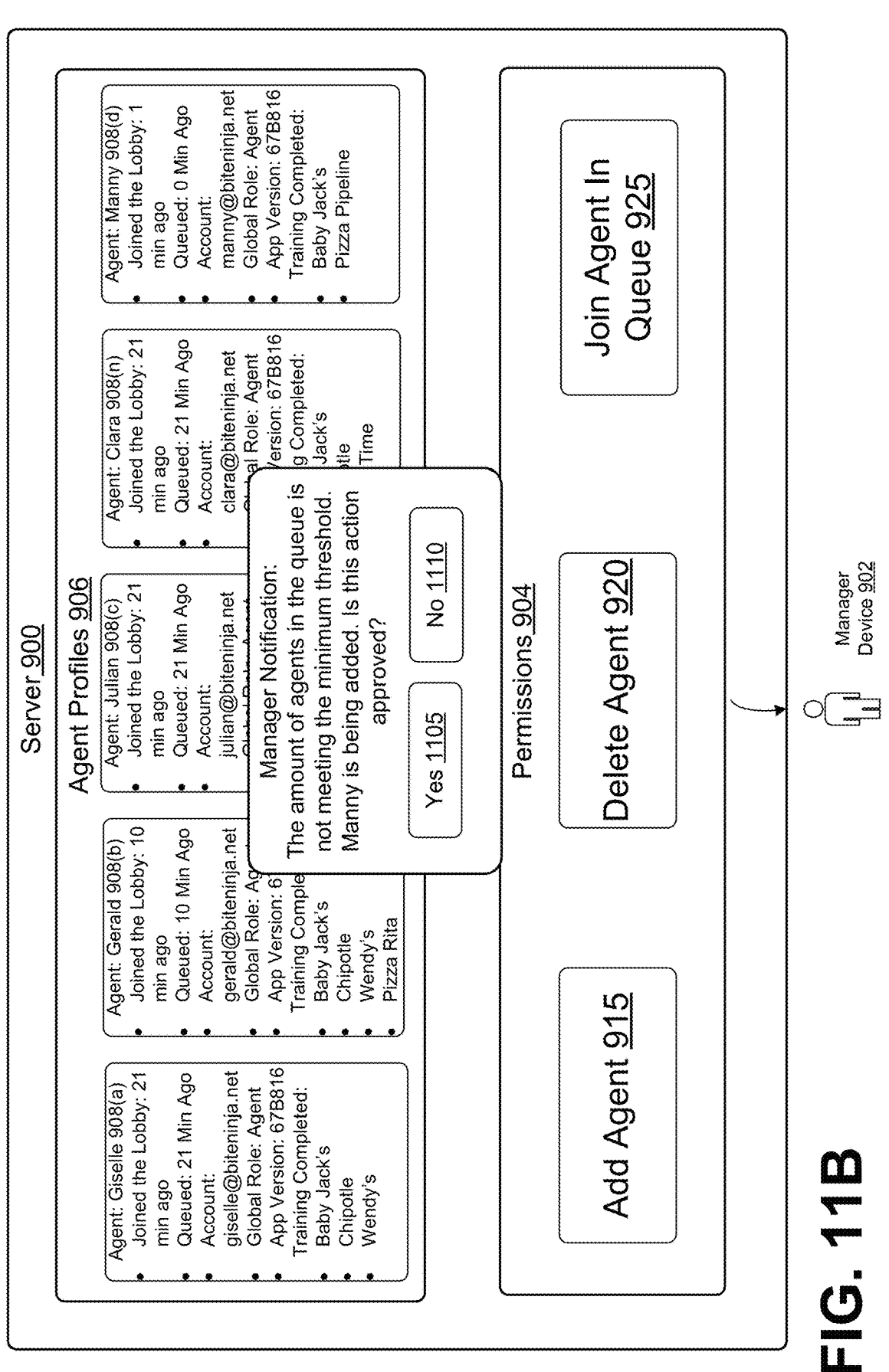
FIG. 11B illustrates a manager approving the action the system requests, effectively adding an agent from the queue.

FIGS. 11A-11B show another example scenario of the management tool where agents are added to a queue. FIG. 11A illustrates a notification 1100 that is displayed on a manager device 902 when the system determines that the number of agents in a queue is not at a minimum threshold. In this example, the system determines that the number of agents in the queue does not meet a minimum threshold in response to the detection of one or more predetermined events. The predetermined events can include a scenario where the system detects that one or more customers has to wait more than a threshold amount of time for an agent to connect to a station. The system can automatically add an agent to a queue, or the system can make a recommendation to add an agent and wait for a manager to confirm the recommendation. In the example of FIG. 11A, the manager device 902 displays a notification 1100 that an agent, e.g., Manny, is being recommended for a queue. The manager device has the option of confirming this recommendation or declining the recommendation.

FIG. 11B illustrates an example of the user interface where a user of the manager device provides an input approving the recommendation of adding an agent to the queue. Once the manager device 902 approves the recommendation, the system adds an agent to the lobby. As shown, the system now displays the profile of the added agent, e.g., Manny. The system is now able to select agent candidates, including Manny, for a queue based on this updated lobby. The system determines if the minimum threshold of agent has been reached. If the system does not meet the minimum threshold of agents, the system adds additional agents.

Turning now to FIG. 12, aspects of a routine for shared resource allocation for multiple queue processing is shown and described. The operations of FIG. 12 described below may be implemented, for example, by portal 120. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

With reference to FIG. 12, routine 1200 begins at operation 1202, where a plurality of availability requests 702 are sent to a plurality of agents 104 that are trained for a target organization 110A. When a location receives an indication that a customer is present, e.g., a car is detected by a drive-through sensor, the system may identify a subset of agents from a pool of agents that are qualified to service that particular location. The system can analyze a database of skill sets of each agent and select agents who have a skill set that matches the skill set requirements of that location. The system can communicate work requests to the predetermined number of agents, and the agent who first provides a confirmation to the first work requests, is selected as the on-deck agent.

Next at operation 1204, a first confirmation 704 is received from a first agent 104C to confirm availability for the target organization 110A. The first agent 104C to respond may be referred to as the "on-deck" agent and will be assigned to the next user that enters an empty queue 340.

Next at operation 1206, an indication that a user 320A has arrived at the front of the queue 340 of the target organization 110A is received. The user 320A may arrive at the front of any queue 340 at any location of the target organization 110A, allowing the on-deck agent 104C to help users at more than one location.

Next at operation 1208, the on-deck agent 104C is connected to a station (310A) proximate to the user 320A. The agent may guide the user through an ordering process or explain to the user procedures for completing orders for a restaurant or request for medical services, among other services.

In operation 1208, a system may utilize artificial intelligence (AI) features for assisting agents in taking orders. In such embodiments, a menu could be accessed by the system. Then, by the use of one or more AI models, the system can use the menu items to help an agent populate an order and/or verify whether the entries are correct. The system can monitor the voice signal of the end user, and by the use of a voice to text translation and by the use of the output of the AI model, the system can populate the order entry for the agent. The agent can then either accept the recommendation or deny it. In addition, the system can use the output of the AI model to help the agent with line completion for text entries. The AI model can be improved based on the agent's feedback.

In general, the routine can include receiving an indication 506 that a user 320A has arrived at a queue 340 of a target organization 110A; in response to the indication 506 that the user 320A has arrived at the queue 340, sending a plurality of availability requests 702 to a plurality of agents 104 trained 304 for the target organization 110A; receiving an availability confirmation 704 from an agent 104C of the plurality of agents 104; and in response to receiving the availability confirmation 704 from the agent 104C, allocating the agent 104C to a station 310A proximate to the user 320A, wherein the system provides an audio connection between a portable device associated with the agent 104C and the station 310A that is proximate to the user.

In other embodiments, an AI model may be utilized in providing order recommendations using a customer's order history. For example, if a user is ordering an ice cream cone with a number of toppings, AI model can provide recommendations based their order history or based on order histories of other customers. In some instances, the AI model can provide recommendations based on order histories of other customers having similar profiles.

In another example, the system can use facial recognition or license plate recognition to provide order recommendations. For example, if the system recognizes a user by the use of facial recognition or license plate recognition, the system will provide the agent with the user's information, such as the user's name, favorite sauces e.g., barbecue sauce, ranch, etc.), and how often the user visits the organization e.g., three times a week). The agent can then create a more personal connection with the user by knowing their preferences upon the user's arrival. This allows a system to automatically populate a customer's order that is based on the facial recognition or license plate recognition and by the use of that user's order history. This can greatly shorten the amount of time a customer spends at any one station, particularly when an end user has a number of customizations to a menu item. This can also increase the efficiency of each agent as there are fewer mistakes and fewer manual data entry points.

The disclosed embodiments can utilize one of more types of language models to assist in the ordering process. A language model can be pre-trained utilizing a menu, user preferences, and/or order histories. This pre-training data enables the model to receive a natural language speech input describing menu items during the ordering process. For example, a menu can include a medium light roast coffee, large light roast coffee, medium dark roast coffee, large dark roast coffee, etc. The language model can generate model data associated with each menu item. The model data can draw associations and relationships between each menu item. This can include data indicating which item is lighter or darker than another item, or which item is larger or smaller than another item, etc. Using the order history, the model data can store keywords that a particular person has used for past orders. Thus, if a person uses "big" coffee and that led to an order with a large coffee, the system uses that keyword "big" for "large" sized items in future orders. This allows users to give a generic natural language suggestion of their order, e.g., "I would like to have a lighter coffee than my last order, but a larger size." The system can then access their history and determine that the last order was, for instance, a medium dark roast coffee. Using the voice input to the language model, the historical order data, and the model data, the system can receive a recommendation from the model, which in this case would be a large light roast coffee.

Each natural language voice input provided to a model can also be accompanied with a prompt for the model to provide a confidence level with each item recommendation. If the model returns a confidence level that is below a threshold, the system can activate a connection between an agent and the station associated with the user. If the confidence score is above the threshold, the system can provide that item recommendation to the user, which can be a text display or a voice output. If the user confirms the item recommendation, the system can add the recommended item to the user's cart. In other embodiments, if the confidence score is above the threshold, the system can use that item recommendation to assist an agent, e.g., help the agent complete order forms, etc. The activation of the agent connection can also be invoked based on other criteria. For example, if the confidence score for a first voice input is below a threshold, the system may ask the user to provide the order again, or ask the user to clarify the order. If the system requires the user to repeat or refine their order more than a threshold number of order attempts, the system can connect the agent at that time.

Next at operation 1210, interaction statistics such as response time 542, interaction time 544, and an interaction metric 546 are captured and stored in response statistics database 540.

Next at operation 1212, the confirming agent 104C is removed from the top of the available agent pool 108.

The routine can also include operations for disconnecting the agent from the station in response to the detection of one or more events. When a queue is no longer associated with a particular agent, the process can be repeated. In subsequent iterations of the routine, the system may change the priority of Agents in a pool based on performance metrics or based on a first-in-line priority system.

In some configurations, a system can include a first camera having a first field of view and a second camera having a second field of view, the system causing a processor to: determine a user identity in response to a detection of a user in the first field of view of the first camera, wherein the first field of view is positioned such that a travel time for the user from the first field of view to the second field of view is greater than a predetermined time threshold, this gives the system time to retrieve the user's order while the user is moving from the first camera to the ordering station; retrieving an order history and preferences of the user based on the user identity by accessing a database of customer records; and verifying the user identity by detecting the user in the second field of view of the second camera using the user identity, wherein the second field of view of the second camera is positioned in proximity to the ordering station, the second camera being in proximity of the ordering station when a microphone and speaker of the ordering station are close enough for the user to verbally communicate with a remote agent using the ordering station; in response to verifying the user identity by detecting the user in the second field of view of the second camera, causing a causing a display of the order history and/or the preferences in a display screen at the ordering station, wherein the display screen is positioned to enable the user to view the order history and/or the preferences, wherein the order history and/or the preferences are also displayed on a display screen of a remote device used by the agent in response to verifying the user identity by detecting the user in the second field of view of the second camera.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented 1) as a sequence of computer implemented acts or program modules running on a computing system and/or 2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 1200 are described herein as being implemented, at least in part, by modules running the features disclosed herein can be a dynamically linked library DLL), a statically linked library, functionality produced by an application programing interface API), a compiled program, an interpreted program, a script, or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 1200 may be also implemented in many other ways. For example, the routine 1200 may be implemented, at least in part, by a processor of another remote computer or a local circuit. In addition, one or more of the operations of the routine 1200 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 13:
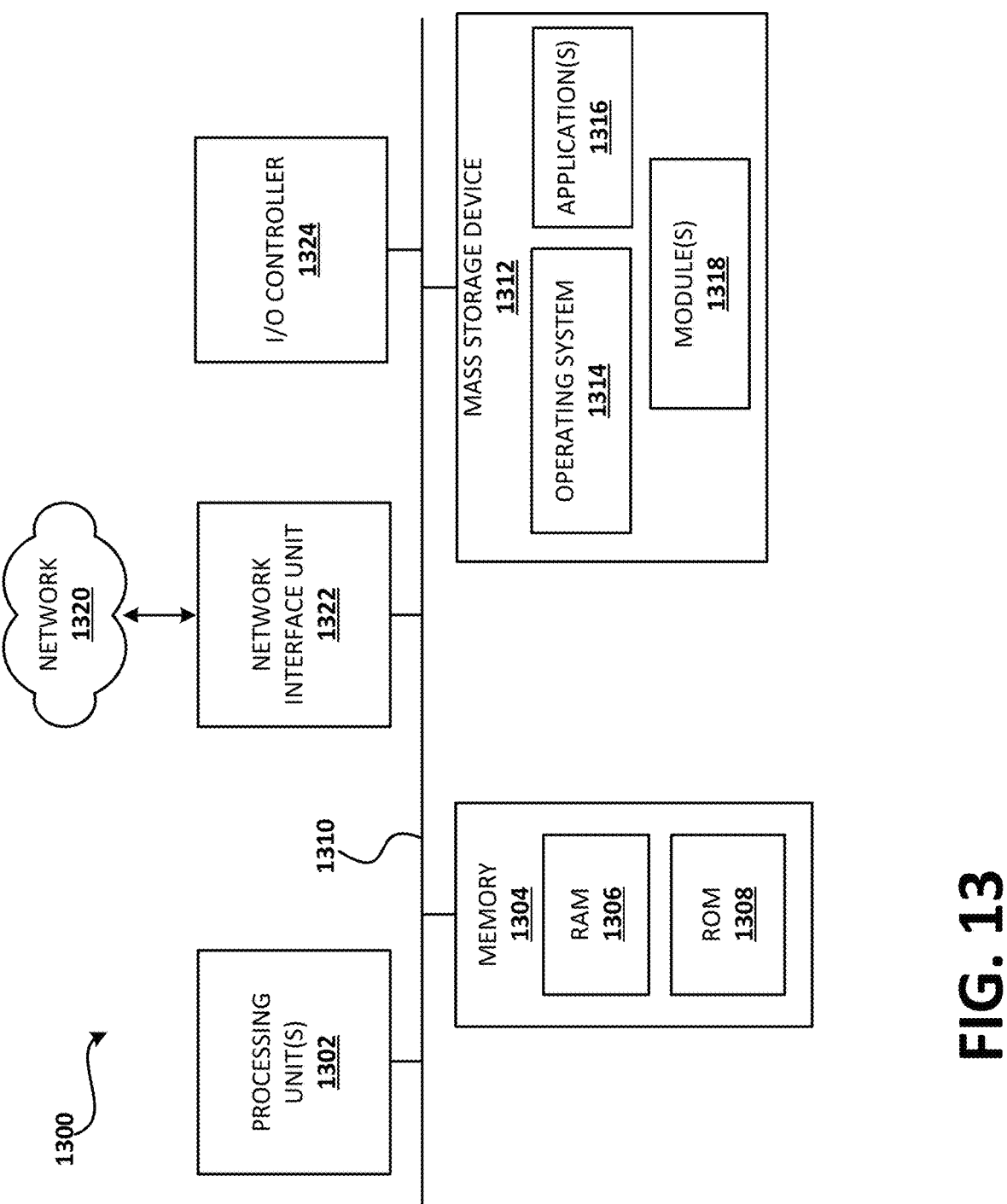
FIG. 13 is a computer architecture diagram illustrating an illustrative computer hardware and software architecture for a computing system capable of implementing aspects of the techniques and technologies presented herein.

FIG. 13 shows additional details of an example computer architecture 1300 for a device, such as a computer or a server configured as part of the systems described herein, capable of executing computer instructions e.g., a module or a program component described herein). The computer architecture 1300 illustrated in FIG. 13 includes processing units) 1302, a system memory 1304, including a random-access memory 1306 "RAM") and a read-only memory "ROM") 1308, and a system bus 1310 that couples the memory 1304 to the processing units) 1302.

Processing units), such as processing units) 1302, can represent, for example, a CPU-type processing unit, a GPU-type processing unit, a field-programmable gate array FPGA), another class of digital signal processor DSP), or other hardware logic components that may, in some instances, be driven by a CPU. For example, and without limitation, illustrative types of hardware logic components that can be used include Application-Specific Integrated Circuits ASICs), Application-Specific Standard Products ASSPs), System-on-a-Chip Systems SOCs), Complex Programmable Logic Devices CPLDs), etc.

A basic input/output system containing the basic routines that help to transfer information between elements within the computer architecture 1300, such as during startup, is stored in the ROM 1308. The computer architecture 1300 further includes a mass storage device 1312 for storing an operating system 1314, applications) 1316, modules 1318, and other data described herein.

The mass storage device 1312 is connected to processing units) 1302 through a mass storage controller connected to the bus 1310. The mass storage device 1312 and its associated computer-readable media provide non-volatile storage for the computer architecture 1300. Although the description of computer-readable media contained herein refers to a mass storage device, it should be appreciated by those skilled in the art that computer-readable media can be any available computer-readable storage media or communication media that can be accessed by the computer architecture 1300.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory RAM), static random-access memory SRAM), dynamic random-access memory DRAM), phase change memory PCM), read-only memory ROM), erasable programmable read-only memory EPROM), electrically erasable programmable read-only memory EEPROM), flash memory, compact disc read-only memory CD-ROM), digital versatile disks DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 900 may operate in a networked environment using logical connections to remote computers through the network 1320. The computer architecture 1300 may connect to the network 1320 through a network interface unit 1322 connected to the bus 1310. The computer architecture 1300 also may include an input/output controller 1324 for receiving and processing input from a number of other devices, including a keyboard, mouse, touch, or electronic stylus or pen. Similarly, the input/output controller 1324 may provide output to a display screen, a printer, or other type of output device.

It should be appreciated that the software components described herein may, when loaded into the processing units) 1302 and executed, transform the processing units) 1302 and the overall computer architecture 1300 from a general-purpose computing system into a special-purpose computing system customized to facilitate the functionality presented herein. The processing units) 1302 may be constructed from any number of transistors or other discrete circuit elements, which may individually or collectively assume any number of states. More specifically, the processing units) 1302 may operate as a finite-state machine, in response to executable instructions contained within the software modules disclosed herein. These computer-executable instructions may transform the processing units) 1302 by specifying how the processing units) 1302 transition between states, thereby transforming the transistors or other discrete hardware elements constituting the processing units) 1302.

FIG. 14 depicts an illustrative distributed computing environment 1400 capable of executing the software components described herein. Thus, the distributed computing environment 1400 illustrated in FIG. 14 can be utilized to execute any aspects of the software components presented herein. For example, the distributed computing environment 1400 can be utilized to execute aspects of the software components described herein.

Accordingly, the distributed computing environment 1400 can include a computing environment 1402 operating on, in communication with, or as part of the network 1404. The network 1404 can include various access networks. One or more client devices 1406A-1406N hereinafter referred to collectively and/or generically as "clients 1406" and also referred to herein as computing devices 1406) can communicate with the computing environment 1402 via the network 1404. In one illustrated configuration, the clients 1406 include a computing device 1406A such as a laptop computer, a desktop computer, or other computing device; a slate or tablet computing device "tablet computing device") 1406B; a mobile computing device 1406C such as a mobile telephone, a smart phone, or other mobile computing device; a server computer 1406D; and/or other devices 1406N. It should be understood that any number of clients 1406 can communicate with the computing environment 1402.

In various examples, the computing environment 1402 includes servers 1408, data storage 1410, and one or more network interfaces 1412. The servers 1408 can host various services, virtual machines, portals, and/or other resources. In the illustrated configuration, the servers 1408 host virtual machines 1414, Web portals 1416, mailbox services 1418, storage services 1420, and/or, social networking services 1422. As shown in FIG. 14 the servers 1408 also can host other services, applications, portals, and/or other resources "other resources") 1424.

As mentioned above, the computing environment 1402 can include the data storage 1410. According to various implementations, the functionality of the data storage 1410 is provided by one or more databases operating on, or in communication with, the network 1404. The functionality of the data storage 1410 also can be provided by one or more servers configured to host data for the computing environment 1402. The data storage 1410 can include, host, or provide one or more real or virtual datastores 1426A-1426N hereinafter referred to collectively and/or generically as "datastores 1426"). The datastores 1426 are configured to host data used or created by the servers 1408 and/or other data. That is, the datastores 1426 also can host or store web page documents, word documents, presentation documents, data structures, algorithms for execution by a recommendation engine, and/or other data utilized by any application program. Aspects of the datastores 1426 may be associated with a service for storing files.

The computing environment 1402 can communicate with, or be accessed by, the network interfaces 1412. The network interfaces 1412 can include various types of network hardware and software for supporting communications between two or more computing devices including, but not limited to, the computing devices and the servers. It should be appreciated that the network interfaces 1412 also may be utilized to connect to other types of networks and/or computer systems.

It should be understood that the distributed computing environment 1400 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1400 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1400 to utilize the functionality described herein for providing the techniques disclosed herein, among other aspects.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for execution on a system, the method comprising:

receiving, from a first sensor positioned a predetermined distance from a station of a queue of a target organization, an indication that a user has entered a field of view of the first sensor, wherein the predetermined distance is selected such that a travel time of the user from the first sensor to the station is greater than a threshold time, wherein the threshold time is determined based at least in part on a size of a pool of available agents and an average response time of agents in the pool;

in response to the indication, concurrently transmitting availability requests to a subset of agents from the pool of agents trained for the target organization, the subset of agents being less than a total number of agents in the pool of available agents;

receiving availability confirmations from one or more of the subset of agents, and selecting as a confirming agent of the subset of agents to return an availability confirmation;

prior to the user arriving at the station, allocating the confirming agent to the station proximate to the user and establishing an audio connection between a portable device associated with the confirming agent and the station;

routing secure transaction data for an order of the user from the station to a secure transaction server without exposing the secure transaction data to the portable device associated with the confirming agent; and automatically disconnecting the audio connection between the portable device associated with the confirming agent and the station when one or more sensors detect that no other users are in proximity to the queue.

2. The method of claim 1, wherein the system maintains the connection between the agent and the station until one or more sensors detect that no other users are in proximity to the queue at the target organization, wherein the method further comprises:

receiving a signal from the one or more sensors indicating that no other users are in proximity to the queue; and disconnecting the audio connection between the portable device associated with the agent and a speaker and a microphone of the station in response to receiving the signal from the one or more sensors indicating that no other users are in proximity to the queue.

3. The method of claim 1, wherein the availability requests is limited to a predetermined number of requests that is based on a number of the agents in a pool of available agents.

4. The method of claim 1, further comprising:

receiving an exit request from the portable device associated with the agent, the exit request initiating operations to disconnect the audio connection between the portable device associated with the agent and a speaker and microphone of the station; and in response to the exit request, initiating operations to disconnect the audio connection between the portable device associated with the agent and a speaker and microphone of the station.

5. The method of claim 4, further comprising:

sending a predetermined number of availability requests to one or more agents of a plurality of agents;

receiving a second availability confirmation from a second agent of the plurality of agents; and in response to receiving the second availability confirmation from the second agent, allocating the second agent to the station proximate to the user, wherein the system provides an audio connection between a second portable device associated with the second agent and other end users in proximity to the station.

6. The method of claim 1, wherein the system serves users in a drive-thru queue, a front counter queue, or a phone queue.

7. The method of claim 1, wherein the system uses license plate and facial recognition sensors to identify a user comprising:

receiving user identification from a field of view 1 that senses a user when they first enter the queue, and receiving a field of view 2 identification from that senses a user when they arrive at the station.

8. The method of claim 1, wherein a manager device oversees the agent profiles and permissions throughout the course of the agent's shift.

9. The method of claim 8, wherein the manager device adds an agent when the number of agents does not meet a minimum threshold.

10. The method of claim 8, wherein the manager device removes an agent when the number of agents exceeds a maximum threshold.

11. The method of claim 8, wherein the manager device enters the queue with the agent during a user's transaction with the queue.

12. A computer-implemented method for execution on a system, the method comprising:

receiving, from a first sensor positioned at a location at a predetermined distance from a station of a queue of a target organization, the first sensor positioned to capture an image used to determine an indication a travel time of a user from the first sensor to the station is greater than a threshold time;

in response to the indication that the travel time of the user from the first sensor to the station is greater than the threshold time, transmitting availability requests to a subset of agents from a pool of agents trained for the target organization, the subset being less than all agents in the pool;

receiving availability confirmations from one or more of the subset of agents, and selecting as a confirming agent of the subset of agents to return an availability confirmation;

prior to the user arriving at the station, allocating the confirming agent to the station proximate to the user and establishing an audio connection between a portable device associated with the confirming agent and the station;

routing secure transaction data from the station to a secure transaction server without exposing the secure transaction data to the portable device associated with the confirming agent; and automatically disconnecting the audio connection between the portable device associated with the confirming agent and the station when one or more sensors detect that no other users are in proximity to the queue.

13. The system of claim 12, wherein the system maintains the connection between the agent and the station until one or more sensors detect that no other users are in proximity to the queue at the target organization, wherein the instructions further cause the one or more processing units to:

receive a signal from the one or more sensors indicating that no other users are in proximity to the queue; and disconnect the audio connection between the portable device associated with the agent and a speaker and a microphone of the station in response to receiving the signal from the one or more sensors indicating that no other users are in proximity to the queue.

14. The system of claim 12, wherein the plurality of availability requests is limited to a predetermined number of requests that is based on a number of the agents in a pool of available agents.

15. The system of claim 12, the instructions further cause the one or more processing units to:

receive an exit request from the portable device associated with the agent, the exit request initiating operations to disconnect the audio connection between the portable device associated with the agent and a speaker and microphone of the station; and in response to the exit request, initiate operations to disconnect the audio connection between the portable device associated with the agent and a speaker and microphone of the station.

16. The system of claim 15, the instructions further cause the one or more processing units to:

send a predetermined number of availability requests to one or more agents of a plurality of agents;

receive a second availability confirmation from a second agent of the plurality of agents; and in response to receiving the second availability confirmation from the second agent, allocate the second agent to the station proximate to the user, wherein the system provides an audio connection between a second portable device associated with the second agent and other end users in proximity to the station.

17. The system of claim 12, wherein the system serves users in a drive-thru queue, a front counter queue, or a phone queue.

18. The system of claim 12, wherein the system uses license plate and facial recognition sensors to identify a user comprising:

receiving user identification from a field of view 1 that senses a user when they first enter the queue, and receiving a field of view 2 identification from that senses a user when they arrive at the station.

* * * * *